US008741801B2

(12) United States Patent
Fang et al.

(10) Patent No.: US 8,741,801 B2
(45) Date of Patent: Jun. 3, 2014

(54) CATALYTIC PLATINUM AND ITS 3D-TRANSITION-METAL ALLOY NANOPARTICLES

(75) Inventors: Jiye Fang, Vestal, NY (US); Jun Zhang, Binghamton, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 234 days.

(21) Appl. No.: 12/953,419

(22) Filed: Nov. 23, 2010

(65) Prior Publication Data

US 2011/0124499 A1    May 26, 2011

Related U.S. Application Data

(60) Provisional application No. 61/263,541, filed on Nov. 23, 2009.

(51) Int. Cl.
*B01J 23/00* (2006.01)
*B01J 21/00* (2006.01)

(52) U.S. Cl.
USPC ........... 502/326; 502/331; 502/337; 502/339; 977/773; 977/775; 977/777; 977/810; 977/840

(58) Field of Classification Search
USPC .......... 977/773, 775, 777, 810, 840; 502/300, 502/326–339
See application file for complete search history.

(56) References Cited

U.S. PATENT DOCUMENTS

| | | | | |
|---|---|---|---|---|
| 6,875,253 B2* | 4/2005 | Daimon et al. | ................. | 75/255 |
| 7,144,627 B2* | 12/2006 | Halas et al. | ................. | 428/403 |
| 7,371,457 B2* | 5/2008 | Oldenburg et al. | ........... | 428/403 |
| 7,455,712 B2* | 11/2008 | Sato | ............................... | 75/255 |
| 7,575,621 B2* | 8/2009 | Vanheusden et al. | .......... | 75/351 |
| 7,625,637 B2* | 12/2009 | Kim | ............................... | 428/570 |
| 7,749,300 B2* | 7/2010 | Chretien et al. | ................ | 75/371 |
| 7,871,738 B2* | 1/2011 | Stamenkovic et al. | ....... | 429/524 |
| 2007/0026292 A1* | 2/2007 | Adzic et al. | ..................... | 429/44 |
| 2007/0031722 A1* | 2/2007 | Adzic et al. | ..................... | 429/44 |

* cited by examiner

*Primary Examiner* — Cam N. Nguyen
(74) *Attorney, Agent, or Firm* — Steven M. Hoffberg; Ostrolenk Faber LLP

(57) ABSTRACT

Platinum (Pt)-based alloys are effective catalysts for oxygen reduction reaction (ORR) or fuel oxidation in proton exchange membrane fuel cells (PEMFCs). A wet-chemical approach for preparing monodisperse $Pt_3Ni$, $Pt_3Co$ and $Pt_3Fe$ nanocubes and $Pt_3Ni$ nanoctahedra which are terminated with {100} and {111} facets, respectively, were developed. Such nanoscaled electrocatalysts supported on carbon black with controlled shape, e.g., octahedral configuration, is provided. ORR activity on the $Pt_3Ni$ nanoctahedra is ~5.1 fold higher than that of nanocubes with a similar size, and their C-supported samples are highly active with respect to commercial Pt/C.

23 Claims, 16 Drawing Sheets

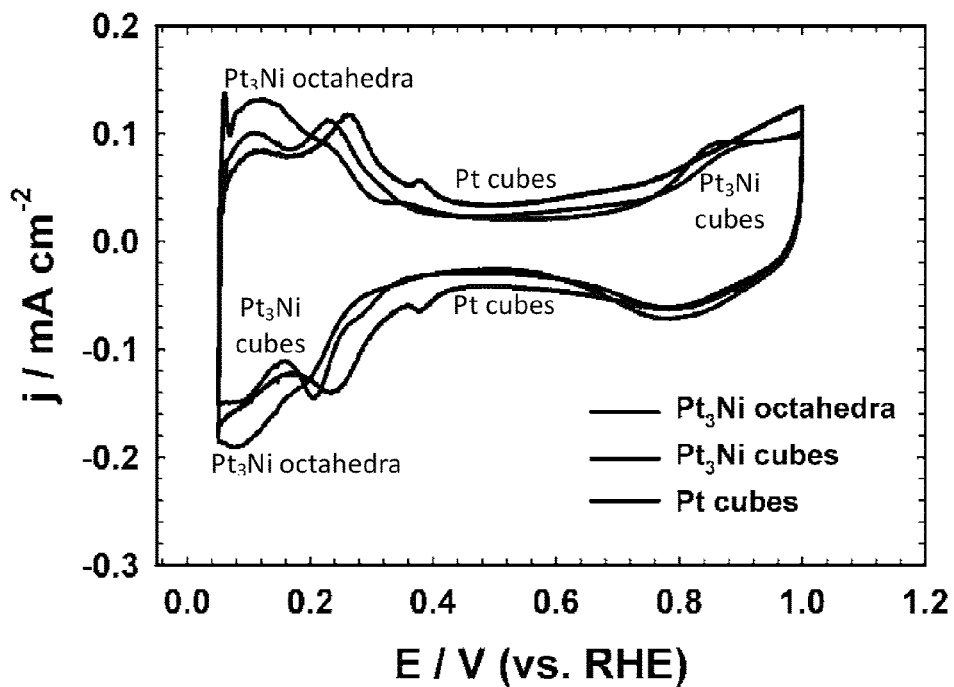
Figure 3
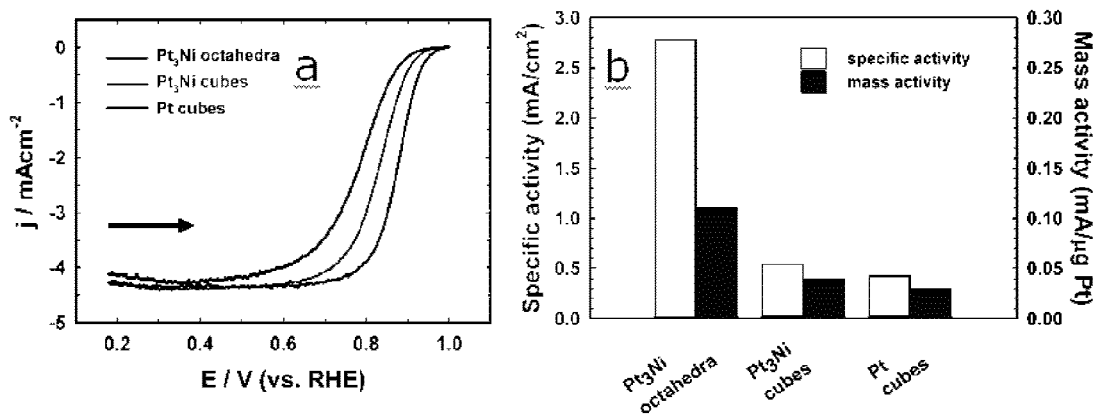
Figure 4A
Figure 4B

| Processing option: All elements analyzed (Normalized); All results in atomic% | | | | | | |
|---|---|---|---|---|---|---|
| Spectrum | In stats. | Ni | Pt | | | |
| Spectrum 1 | Yes | 23.81 | 76.19 | Mean | 23.51 | 76.49 |
| Spectrum 2 | Yes | 23.37 | 76.63 | Std. deviation | 0.23 | 0.23 |
| Spectrum 3 | Yes | 23.42 | 76.58 | Max. | 23.81 | 76.82 |
| Spectrum 4 | Yes | 23.18 | 76.82 | Min. | 23.18 | 76.19 |
| Spectrum 5 | Yes | 23.68 | 76.32 | | | |
| Spectrum 6 | Yes | 23.60 | 76.40 | | | |

Figure 10B

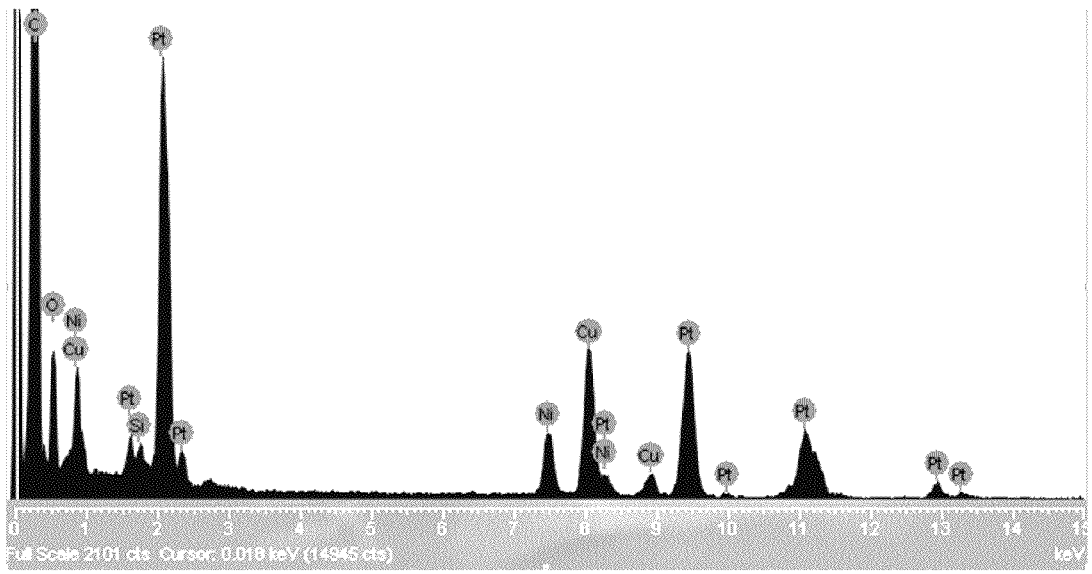

Figure 10C

| Processing option: All elements analyzed (Normalized); All results in atomic% | | | | | | |
|---|---|---|---|---|---|---|
| Spectrum | In stats. | Ni | Pt | | | |
| Spectrum 7 | Yes | 23.63 | 76.37 | Mean | 23.39 | 76.61 |
| Spectrum 8 | Yes | 23.30 | 76.70 | Std. deviation | 0.26 | 0.26 |
| Spectrum 9 | Yes | 22.98 | 77.02 | Max. | 23.63 | 77.02 |
| Spectrum 10 | Yes | 23.63 | 76.37 | Min. | 22.98 | 76.37 |
| Spectrum 11 | Yes | 23.23 | 76.77 | | | |
| Spectrum 12 | Yes | 23.57 | 76.43 | | | |

Figure 10D

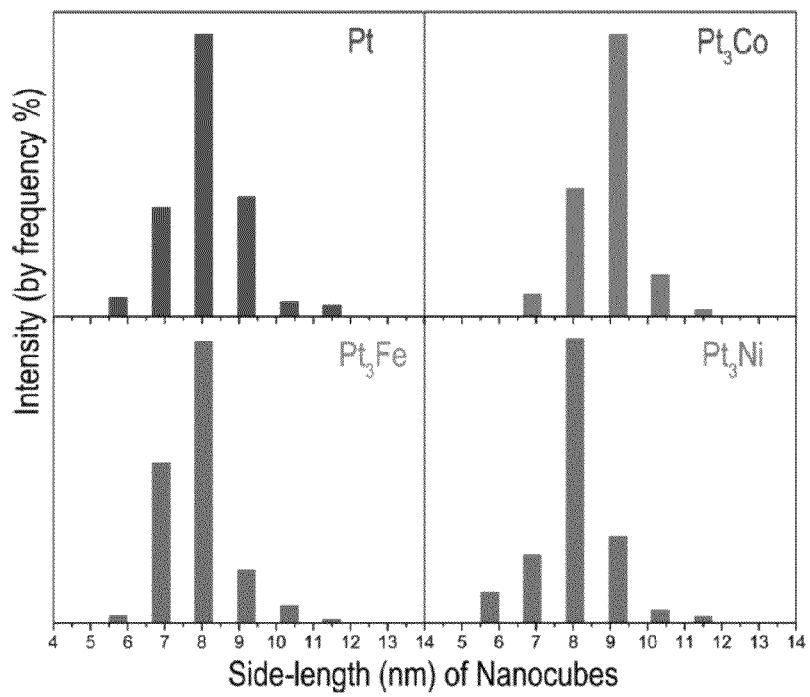
Figure 15
Figure 16A    Figure 16B
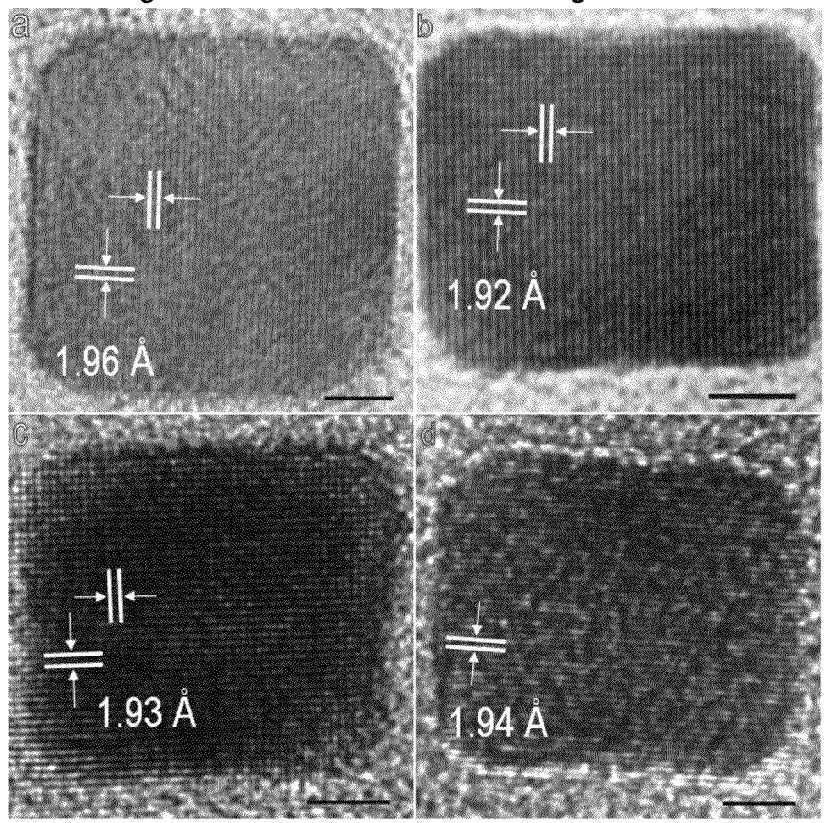
Figure 16C    Figure 16D

CATALYTIC PLATINUM AND ITS 3D-TRANSITION-METAL ALLOY NANOPARTICLES

This invention was made with government support under DMR-0731382 awarded by the National Science Foundation. The government has certain rights in the invention.

BACKGROUND OF THE INVENTION

It is an urgent task to seek other energetic resources or different energy conversion pathways to replace the burning of fossil fuels such as gasoline or diesel, due to the increasing worldwide energy demand and environmental concerns. One of the promising efforts is the development of fuel cell technology. Fuel cells exhibit exciting performance advantages for power generation by converting the chemical energy of a fuel directly into electricity. The intense interest in fuel cell technology stems from the fact that fuel cells are environmentally benign and extremely efficient. Among various types of fuel cells, the proton-exchange membrane fuel cells (PEM-FCs) and direct methanol fuel cells (DMFCs) are appealing for automotive and portable electronic applications owing to their low operation temperatures.[1-3] Unfortunately, the slow rate of the oxygen reduction reaction (ORR) on the PEM and the high cost of Pt electrocatalyst still remain serious limitations to many applications. In this regard, it is rather challenging to explore more active and low-cost catalysts superior to the standard carbon-supported platinum (Pt/C) particle systems which are traditionally employed.

Precious metal, platinum (Pt), is traditionally used as a high-performance electrocatalyst for proton-exchange membrane fuel cells and fine chemical synthesis. Due to the high-cost and the scarcity of Pt, it is an urgent task to develop substitutes for the pure Pt-catalyst. To date, one of the most successful accomplishments is to partially substitute Pt using less expensive 3d-transition metals. It was also realized that the shape and surface structure of nanocrystals (NCs) play a significant role in electrocatalytic activity and reaction durability. For instance, it has been reported that cubic Pt NCs possess unusual catalytic activity in oxidation reactions. As well-known, the electron density of state is actually sensitive with the surface structure, and different crystal facets could have diverse catalytic natures.

Platinum nanoparticles (Pt NPs) have been extensively studied because of their unique catalytic properties in various significant applications.[1-8] It has been shown that the catalytic activity of Pt NPs is highly dependent on the surface atomic arrangements of the particles.[9-11] For example, previous studies on oxygen reduction in adsorbing acidic solutions show that Pt $\{100\}$ planes are more active than Pt$\{111\}$ planes,[12, 13] and the current density measured on Pt nanocubes is higher than that of truncated cubic Pt NCs.[14] Pt nanocubes[15-17] have therefore received more attention as electrocatalysts than other morphologies such as multipods [18, 19] and one-dimensional nanostructures.[20, 21] To further reduce the overall use of expensive Pt and afford the potential of poisoning resistance, platinum-based bimetallic Nanocrystals such as Pt—Ni,[22, 23] Pt—Co,[24-28] and Pt—Cu[29-32] have attracted increasing interest. Moreover, recent reports indicate that electrocatalytic activities of some platinum-containing bimetallic Nanocrystals are superior to those of pure Pt metal.[25-28]

Both PEMFCs and DMFCs use polymer electrolyte membrane (PEM) and platinum (Pt)[4, 5] or Pt-based alloys catalysts. Unfortunately, the slow rate of the oxygen-reduction reaction (ORR), the high cost and the vulnerability toward reaction poisons of Pt electrocatalyst remain serious limitations to many applications.[3, 6] In this regard, it is crucial for fuel cell development to explore more active and poison-resistant catalysts that are superior to the traditionally employed carbon-supported platinum (Pt/C) particle systems. There has been considerable progress on the search for Pt-based bimetallic electrocatalysts, such as forming Pt—Pd nanocomposites,[7, 8] or Pt-monolayer on a second metal,[9] or alloying Pt with less expensive 3d-transition metals,[10, 11] including Fe,[11, 12] Co,[13, 14] Ni,[15, 16] Cu,[17, 18] Cr,[12] and Mn.[15] It was reported that the catalytic activity of $Pt_3M$ (M=V, Ti, Co, Fe, Ni) is significantly improved[19, 20] with strong resistance to poisonous substances.[21] Recently, Stamenkovic et al. demonstrated that extended single crystal surfaces of $Pt_3Ni$ $\{111\}$ exhibit an enhanced ORR activity that is 10-fold higher than Pt$\{111\}$ and 90-fold higher than the current state-of-the-art Pt/C catalysts.[22] Such a remarkable activity was attributed to the weaker OH adsorption arising from the decrease of the d-band center on the Pt-skin formed by surface segregation. Like many other heterogeneous catalysis studies,[23, 24] a fundamental question is whether such a high activity observed on the extended single crystal surfaces can be obtained from nanometer-sized particles. To bridge this size gap, the challenge is to produce crystal facet-controlled monodisperse $\{111\}$-bounded $Pt_3Ni$ NCs. Although Monte Carlo simulation suggested that $\{111\}$-facet-terminated $Pt_3Ni$ nanoctahedra would be energetically stable and have a surface segregation profile similar to that of the extended $Pt_3Ni$ surfaces,[22, 25] direct experimental evidence has not been obtained.

SUMMARY OF THE INVENTION

The present invention relates to the synthesis of platinum catalytic NPs, having controlled configuration, such as nanoctahedra and nanocubes, which are enclosed by $\{111\}$ and $\{100\}$ facets, respectively, via a high-temperature organic solution chemistry approach.

For example, the ORR activity on $Pt_3Ni$ nanoctahedra is significantly higher than that on $Pt_3Ni$ nanocubes. A reduction of Pt(acac)$_2$ produces Pt Nanocubes (NCbs), whereas a co-reduction of [Pn(acac)$_2$] and an M-metal salt (M=Co, Fe, Ni), generates NCbs $Pt_3Co$, $Pt_3Fe$, $Pt_3Ni$ or nanoctahedra, respectively. Tungsten hexacarbonyl (W(CO)$_6$) is found to be an effective particle shape control agent.

The present technique can control, for example, a $Pt_3Ni$ particle shape produced from a high-temperature wet-chemical reaction. It was determined that octahedral $Pt_3Ni$ NPs give the higher electrocatalytic activity towards ORR reaction, compared to other shapes. The ORR activity on the $Pt_3Ni$ nanoctahedra is ~5.1 fold higher than that of nanocubes with a similar size. The specific and mass activity of $Pt_3Ni$-octa/C is 6.3 and 3 times, respectively, higher than those of the commercial Pt/C catalysts, although the size of the $Pt_3Ni$ nanoctahedra is ~3 times larger (means there will be much more room to further increase the activity of the nanoctagedra if the size can be further reduced).

Increasing the kinetics of ORR is a key challenge in PEMFCs. A promising approach is to use Platinum (Pt)-based alloys. Pt-based NPs of alloys have been extensively shown to be effective catalysts for ORR in PEMFCs. However, less attention has been paid on the particle shape-control.

Furthermore, the shape-dependent ORR activity likely exists on other metallic catalysts. The present shape-controlled strategy may be extended to the syntheses of other nonprecious metal-Pt nanopolyhedral alloys, which are candidates of highly active fuel cell catalysts.

One embodiment of the present technique employs a wet-chemical approach of preparing monodisperse $Pt_3Ni$ nanoctahedra and NCbs terminated with {111} and {100} facets, respectively.

One aspect of the technique employed in a preferred high-temperature reaction, is to introduce a foreign element, tungsten (W) through a decomposition of Tungsten Hexacarbonyl, $W(CO)_6$.

It is generally accepted that the development of NCs in a solution system consists of a nucleation stage and a subsequent Ostwald ripening growth on the existing seeds (or nuclei).[27, 28] As shown in FIG. 13, the rates of nucleation and subsequent NC growth are the keys in shape control.[28, 29] In the rapid nucleation stage, kinetic deposition of atom clusters onto seeds is mainly driven by the supersaturation of the precursors,[29] whereas in the Ostwald ripening growth the NC shape may be thermodynamically controlled by the difference of the surface energy on each crystallographic face.[30] The short nucleation burst often consumes most precursors, resulting in small and less shape-controlled colloids due to insufficient feedstock for the growth stage. To circumvent this, a dynamic injection approach, in which additional feedstock was continuously provided to the system during the stage of Ostwald ripening growth, was previously employed in preparation of oxide[31, 32] and semiconductor [33, 34] Nanocrystals. Unfortunately, this method was unsuccessful in the synthesis of $Pt_3Ni$ Nanocrystals.

A distinct approach was therefore adopted, to control the nucleation rate by introducing a foreign element, tungsten (W), to "self-provide" stable sources of Pt clusters in the growth stage. Using this strategy, $Pt_3Ni$ nanoctahedra were successfully prepared via a reaction between nickel (II) acetylacetonate [$Ni(acac)_2$] and platinum (II) acetylacetonate [$Pt(acac)_2$] in a mixture of oleic acid and oleylamine at ~200° C. in the presence of tungsten hexacarbonyl [$W(CO)_6$]. Generally, it is very effective to control the morphology of NCs by introducing foreign metallic ions or a metal in-situ decomposed from a carbonyl. For example, Fe and Ag ions have been used to tune the nanostructure of Pt,[35, 36] and $Fe(CO)_5$ has also been employed in the particle shape-control of PtFe[37] and Pt[4] NCs. It was recently demonstrated that gaseous CO can be used in controlling the shape of Pt and generate Pt NCbs; (Yijin Kang, Xingchen Ye, and Christopher B. Murray, "Size- and Shape-Selective Synthesis of Metal Nanocrystals and Nanowires Using CO as a Reducing Agent", Angew. Chem. Int. Ed. 2010, 49, 6156-6159), however, the role of $W(CO)_6$ in preparation of binary $Pt_3Ni$ nanoctahedra and NCbs can NOT be replaced by that of CO.

For preparation of $Pt_3Ni$, it is revealed that the presence of $W(CO)_6$ is useful in shape-control. Without $W(CO)_6$, $Pt_3Ni$ Nanocrystals can still be generated, but their morphology appeared much less controlled. Since W does not alloy with Pt under the reaction conditions,[38, 39] which is supported by inductively coupled plasma mass spectroscopic (ICP-MS) and energy dispersive X-ray spectroscopic (EDS) analyses, [40] the relatively low redox-potential of W decomposed from $W(CO)_6$, in comparison with that of Pt,[41] could help reduce $Pt(acac)_2$ to Pt atoms (or seeds) rapidly in the early stage of the reaction, leading to a fast Pt-nucleation; [42, 43] whereas the resultant W cations may be accumulated in a relatively high concentration that will decelerate the subsequent metallic particle growth under the following equilibrium ($Pt^{2+}+W^0 \leftrightarrows W^{n+}+Pt^0$). Thus, the Pt/precursor-W system acts as a "buffer", ensuring a steady growth of particles with a sufficient feedstock.[44] A piece of evidence supporting this notion is the observation of $W^{6+}$ peak in the XPS spectra of the reaction residue. The low rate of Pt-nucleation favors the evolution of $Pt_3Ni$ Nanocrystals because Pt clusters can be steadily and continuously provided for the Ostwald growth in this case. In addition, $W(CO)_6$ is not so volatile, compared to other carbonyls such as $Fe(CO)_5$.

In a face centered cubic (fcc) system,[28, 30] both theoretical prediction[45, 46] and experimental investigation[46, 47] indicate that $Pt_3Ni$ {111} facets are thermodynamically most stable and have a lowest growth rate in {100} directions. This promotes a rapid elimination of other $Pt_3Ni$ planes,[48, 49] leading to the formation of $Pt_3Ni$ nanoctahedra. It is worth mentioning that the combined capping ligands, oleic acid-oleylamine, are important. Not only is oleylamine a reducing agent, but it also plays a role of stabilizing $Pt_3Ni$ {111} by lowering the surface energy on $Pt_3Ni$ {111} facets. Without them, the synthesis of $Pt_3Ni$ nanoctahedra was unsuccessful under the conditions tested. Note that facets being more selectively capped by oleic acid-oleylamine are not fixed, but rather strongly dependent on the material. For instance, it has been reported that a combination of oleic acid-oleylamine facilitates the stabilization of Pt {100} facets, instead of Pt {111} planes.[50]

$Pt_3Ni$ NCbs were prepared using the same recipe as that for nanoctahedral synthesis except for a slower rate of injecting nickel chloride hexahydrate into the system in a temperature range between 130 and 200° C.[44] Due to the lack of stoichiometric nickel precursors in this approach, Pt seeds at the initial stage as well as Pt-surface-enriched $Pt_3Ni$ NCs in the subsequent steps should always dominate the crystal growth, which is the driving force for developing cubic NCs. On the other hand, the extremely strong capability for Ni to alloy with Pt enables the limited amount of Ni, reduced from the slowly titrated nickel precursors, to promptly combine with Pt through interlayer-diffusions with neither formation of pristine Ni-phase, nor the Pt-core-Ni-shell structure.[51] Pure Ni NCs could be detected only when the nickel precursors were introduced at a temperature higher than 210° C.

It is therefore an object to provide a method of forming catalytic particles, and the catalytic particles formed thereby, and a catalytic membrane using catalytic particles formed by a method comprising: heating and mixing a soluble platinum salt in an organic solution comprising a set of capping agents having a reducing potential sufficient to reduce the platinum salt, and having surface active properties to lower a surface energy on facets of formed particles; adding a shape control agent comprising a metal other than platinum, to selectively control a particle shape; and separating formed particles from the solution. The formed particles are preferably resuspended in a non-polar organic solvent. The particles are preferably nanocubes or nanotetrahedra, configured to catalyze an oxidation reduction reaction of a direct methanol fuel cell with greater resistance to carbon monoxide poisoning than a platinum catalyst particle having the same surface area. The formed particles are preferably monodisperse.

The organic solution preferably comprises oleylamine and oleic acid with various ratios. An optimized ratio of 4:1 (vol.) is used in $Pt_3Ni$ system.

The soluble platinum salt is, for example, platinum (II) acetylacetonate.

The process is preferably conducted under anoxic conditions.

The solvent is preferably heated to a temperature of about 170° C. to 240° C.

The method may further comprise adding a soluble transition metal salt to the organic solvent, wherein the formed particles comprise an alloy of platinum and the transition metal. The transition metal may be, for example, nickel, copper, cobalt, or iron. The transition metal salt may be, for example, nickel (II) acetylacetonate, and the particles formed comprise Pt$_3$Ni nanocubes, at least one of copper (II) chloride, bromide, and iodide, and the formed particles comprise PtCu, cobalt(II) acetate tetrahydrate, and the formed particles comprise Pt$_3$Co, or iron(II) chloride tetrahydrate, and the formed particles comprise Pt$_3$Fe.

The shape control agent may comprises, for example, tungsten hexacarbonyl, molybdenum hexacarbonyl, and/or chromium hexacarbonyl.

BRIEF DESCRIPTION OF THE DRAWINGS

FIGS. 1A and 1F, 1B and 1G, 1D and 1I, and 1E and 1J are Field-emission SEM images, High-resolution SEM images, TEM images, and high-resolution TEM images of single Nanocrystals, respectively. FIG. 1C shows a 3D octahedron and FIG. 1H shows a cube.

FIGS. 2A and 2C are Nanoctahedra. FIGS. 2B and 2D are Nanocubes. The Samples shown in FIGS. 2A and 2B were randomly deposited on a PANalytical Si Zero background sample holder. The Samples shown in FIGS. 2C and 2D were assembled on a polished Si wafer.

FIG. 3 shows a plot of Cyclic voltammograms of Pt$_3$Ni nanoctahedra, Pt$_3$Ni nanocubes and Pt nanocubes in 0.1 M HClO$_4$ solution. Scan rate: 100 mV s$^{-1}$.

FIG. 4A shows polarization curves for ORR on Pt$_3$Ni nanoctahedra, Pt$_3$Ni nanocubes and Pt nanocubes supported on a rotating GC disk electrode in O$_2$ saturated 0.1 M HClO$_4$ solution at 295 K. Scan rate: 20 mV s$^{-1}$; rotation rate: 900 rpm. Catalyst loading in terms of Pt mass: Pt$_3$Ni octahedra: 3.0 µg; Pt$_3$Ni cube: 2.0 mg; Pt cube: 1.1 µg. Current density was normalized to the glassy carbon geometric surface area (0.196 cm$^2$). The arrow indicates the potential scan direction.

FIG. 4B shows a comparison of the ORR activities on the three types of catalysts. Specific activity and mass activity were all measured at 0.9 V versus RHE at 295 K.

FIG. 6A is a positive image, and FIG. 6B is a negative image. The projection direction is {110}.

FIGS. 10A and 10C show typical spectra of TEM-EDS analyses for Pt$_3$Ni nanoctahedra (spectrum 1) and Pt$_3$Ni nanocubes (spectrum 7), respectively. FIGS. 10B and 10D show the associated statistics for FIGS. 10A and 10C, respectively.

FIGS. 14A-14C show Pt nanocubes synthesized at 200° C.; FIGS. 14D-14F show Pt$_3$Co nanocubes synthesized at 200° C.; FIGS. 14G-14I show Pt$_3$Fe nanocubes synthesized at 150° C.; and FIGS. 14J-14L show Pt$_3$Ni nanocubes synthesized at 200° C.; FIGS. 14A, 14D, 14G and 14J show TEM images (data bars represent 50 nm); FIGS. 14B, 14E, 14H, and 14K show the selected area electron diffraction (negative) pattern of the nanocubes; and FIGS. 14C, 14F, 14I, and 14L show high-resolution TEM images of the nanocubes (scale bars represent 2 nm).

FIG. 15 shows particle size (side-length) distribution of four types of nanocubes: Pt, Pt$_3$Co, Pt$_3$Fe, and Pt$_3$Ni. Data are from TEM images of more than 200 selected particles in each case.

FIGS. 16A-16D show typical spectra of TEM-EDS analyses: FIG. 16A shows Pt$_3$Co nanocubes (spectrum 2); FIG. 16B shows Pt$_3$Fe nanocubes (spectrum 16); and FIG. 16C shows Pt$_3$Ni nanocubes (spectrum 7). FIG. 16D shows Pt nanocubes. All the samples were synthesized at 240° C.

FIG. 17A shows Pt$_3$Co nanocubes (spectrum 2); FIG. 17B shows Pt$_3$Fe nanocubes (spectrum 16); and FIG. 17C shows Pt$_3$No nanocubes (spectrum 7). All the samples were synthesized at 240° C.

FIGS. 18A and 18E show Pt, FIGS. 18B and 18F show Pt$_3$Co, FIGS. 18C and 18G show Pt$_3$Fe, and FIGS. 18D and 18H show Pt$_3$Ni; FIGS. 18A-18D show samples were randomly deposited on a PANalytical zero-background Si sample holder, and FIGS. 18E-18H show samples which were assembled on a surface-polished 25 mm Si {100} wafer.

FIGS. 20A-20D show TEM images of: FIG. 20A Pt; FIG. 20B Pt$_3$Co; FIG. 20C Pt$_3$Fe and FIG. 20D Pt$_3$Ni; data bars represent 50 nm.

FIG. 21A, 10 mL of oleylamine without oleic acid; FIG. 21B, 9 mL of oleylamine and 1 mL of oleic acid; and FIG. 21C, 8 mL of oleylamine and 2 mL of oleic acid. A precipitation was resulted when a single oleic acid was used as the solvent. Data bars represent 50 nm.

DETAILED DESCRIPTION OF THE PREFERRED EMBODIMENTS

Figure 1:
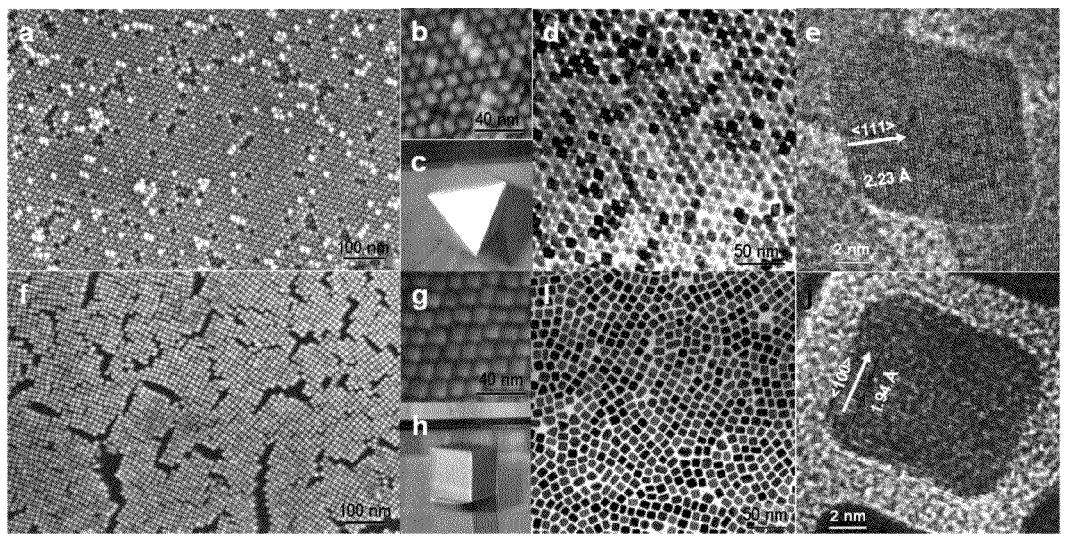
FIGS. 1A to 1E and 1F to 1J show images for Pt$_3$Ni nanoctahedra and nanocubes, respectively.

Chemicals and Materials.

Tungsten hexacarbonyl (97%), Cobalt acetate tetrahydrate (99.999%), iron(II) chloride tetrahydrate (99.99%), oleic acid (90%) and oleylamine (70%), and benzyl ether (99%) were obtained from Aldrich (Sigma-Aldrich, St. Louis Mo.) and were used as received. Platinum (II) acetylacetonate (49.3-49.8% Pt), Nickel (II) acetylacetonate (97%), anhydrous ethanol (200 proof) and anhydrous hexane (98.5%) were from Gelest (Morrisville Pa.), Alfa Aesar (Ward Hill Mass.), AAPER (Shelbyville Ky.) and BDH (VDW, Westchester Pa.), respectively, without further purification. Commercial Pt/C catalysts were purchased from Johnson Matthey (New York N.Y.)(40 wt % Pt). Carbon black (Vulcan XC-72) was received from Cabot Corporation (Billerica Mass.).

Characterization Method.

X-ray diffraction patterns were collected using a PANalytical X'Pert X-ray powder diffractometer equipped with a Cu $K\alpha 1$ radiation source ($\lambda$=0.15406 nm). A Hitachi 7000 transmission electron microscope (TEM) operated at 110 kV was used for traditional TEM imaging and a JEOL-2010 FEG TEM operated at 200 kV was used for high-resolution transmission electron microscopy imaging, selected-area electron diffraction, and energy-dispersive x-ray spectroscopy data collection. ICP-MS and ICP-AES analyses were conducted in Department of Geosciences, University of Houston Infrared spectrum was acquired using a Bruker FTIR spectrometer (EQUINOX 55). XPS analysis was conducted on a Surface Science Instruments SSX-100 with an operating pressure of <2×$10^{-9}$ Torr and monochromatic Al $K\alpha$ x-rays at 1486.6 eV. Beam diameter was 1000 microns. Photoelectrons were collected at an emission angle of 55-degrees from the surface normal hemispherical analyzer with pass energy of 150V for survey scans and 50V for high resolution scans.

Example 1

Synthesis of $Pt_3Ni$ Nanoctahedra and Nanocubes

A typical procedure for synthesizing $Pt_3Ni$ nanoctahedra is as follows: under airless conditions, platinum (II) acetylacetonate (20 mg, 0.05 mmol), nickel (II) acetylacetonate (10 mg, 0.04 mmol), oleylamine (9.0 mL) and oleic acid (1.0 mL) were loaded into a three-neck flask and heated to 130° C. under an argon stream. Tungsten hexacarbonyl (50 mg, 0.14 mmol) was then added into the vigorously stirred solution, and the temperature was subsequently raised to 230° C. and maintained for 40 min with vigorous agitation. The resultant products were isolated by centrifugation after adding a sufficient amount of absolute ethanol, and washed with anhydrous hexane for several cycles. The $Pt_3Ni$ nanooctahedra were finally re-dispersed in hexane, forming a colloidal suspension. The yield was estimated as high as ~80% on the basis of Pt.

To synthesize $Pt_3Ni$ nanocubes, platinum (II) acetylacetonate (20 mg, 0.05 mmol), oleylamine (9.0 mL) and oleic acid (1.0 mL) were similarly loaded into a three-neck flask under an argon stream. Once the system was heated to 130° C., tungsten hexacarbonyl (50 mg, 0.14 mmol) was then added into the vigorously stirred solution. Subsequently, a stock solution of Ni-precursors (0.4 mL, 0.04 mmol), which was pre-prepared by dissolving 0.238 g of nickel (II) chloride hexahydride into a mixed solvents containing oleylamine (5.0 mL) and oleic acid (5.0 mL), was added dropwise within 15 min while the temperature was steadily raised from 130 to 200° C. The colloids were further evolved at 240° C. for additional 15 min. The isolation procedure of these $Pt_3Ni$ nanocubes is the same as that for $Pt_3Ni$ nanoctahedra. The Pt-based yield was estimated as ~70%.

Synthesis of Pt Nanocubes.

The procedure was exactly the same as that for $Pt_3Ni$ nanoctahedra, except the absence of Ni-precursors.

Preparation of Carbon-Black-Supported $Pt_3Ni$ Nanoctandra ($Pt_3Ni$-octa/C)

The carbon black-supported $Pt_3Ni$ nanoctahedra catalysts ($Pt_3Ni$-octa/C) were prepared using the following procedures: 0.020 g of carbon black (Vulcan XC-72) was first mixed with 5 mL of anhydrous hexane (BDH) containing 0.020 g of as-synthesized $Pt_3Ni$ nanoctahedra. After the container was ultrasonicated for 30 min, 15 mL of anhydrous ethanol (200 proof) (AAPER) was added into the suspensions, followed by an ultrasonication for additional 30 min. The mixture was then evaporated slowly by purging with argon while stirring. The resultant precipitate was re-washed with acetone (99.5%, BDH) and collected by centrifugation for several cycles, and finally re-dispersed into 10 mL of anhydrous hexane followed by stirring for ~8 h. The catalyst powder was isolated by centrifugation and re-dispersed in hexane for electrochemical evaluation.

Structural Analysis.

X-ray diffraction patterns were collected using a PANalytical X'Pert X-ray powder diffractometer equipped with a Cu $K\alpha 1$ radiation source ($\lambda$=0.15406 nm). A Hitachi 7000 transmission electron microscope (TEM) operated at 110 kV was used for traditional TEM imaging and a JEOL-2010 FEG TEM operated at 200 kV was used for high-resolution transmission electron microscopy imaging, selected-area electron diffraction, and X-ray energy-dispersive spectroscopy data collection. ICP analysis was conducted in Department of Geosciences, University of Houston. Scanning electron micrographs were recorded on a field emission scanning electron microscope (Carl Zeiss Supra 55VP).

Electrode Preparation and Electrochemical Measurements.

The thin layers of catalysts supported on glassy carbon were prepared by using two methods. For $Pt_3Ni$ Nanocrystals, a spin-coating method was applied. In short, glassy carbon disk electrodes (Pine Research Instrumentation, Raleigh, N.C., 5 mm diameter) were polished to a mirror-finish prior to each experiment and served as substrates for the catalysts. In each case a thin film of $Pt_3Ni$ Nanocrystals on a glassy carbon electrode was formed by spin-coating using a spin coater (Headway Research Inc., Garland, Tex.) with a drop of $Pt_3Ni$ NC suspension. The $Pt_3Ni$ NC suspension was obtained by washing the as-prepared colloidal solution twice with hexane to remove the majority of unbound surfactants and then redispersed in hexane. The amount of $Pt_3Ni$ Nanocrystals on the glassy carbon can be increased by repeating the spin-coating process. The glassy carbon electrode supported Pt$_3$Ni NC catalysts were subjected to an argon plasma (100 W, 0.3 Ton) (PX250, March Plasma Systems, Concord, Calif.) treatment for 5 min to remove the residual organic solvent and surfactants on Pt$_3$Ni Nanocrystals. The electrodes were then subjected to an electrochemical treatment by potential cycling between 0.05 to 1.0 V at 100 mV s$^{-1}$ until stable voltammograms were obtained, typically within 25 cycles. For Pt$_3$Ni octa/C and Pt/C catalysts, Watanabe's method[26] was followed to prepare the catalyst layer on the glassy carbon electrode. Commercially available Pt/C catalyst (Johnson Matthey, 40 wt % Pt) was used to prepare 0.2 μg-Pt/μL catalyst suspension. A constant volume (18 μL) of the suspension was pipetted onto a glassy carbon surface and dried under ethanol vapor pressure. A 10 μL of 0.05 wt % Nafion solution was then coated on top of the dried catalyst layer and was dried under ethanol vapor pressure. Electrochemical treatment was similar to that of Pt$_3$Ni NC catalysts.

The electrochemical experiments were conducted with a CHI 700B electrochemical analyzer (CH instruments, Austin, Tex.) and a rotating disk assembly (Pine Research Instrumentation, Raleigh, N.C.) in a two-compartment electrochemical cell. A Pt wire served as the counter electrode and an Ag/AgCl electrode saturated with KCl was used as the reference electrode. The electrode potential in this study, however, is reported with respect to the Reversible Hydrogen Electrode (RHE). The electrolyte, 0.1 M HClO$_4$, was prepared from double-distilled 70% HClO$_4$ (GFS chemicals, Columbus, Ohio) with 18.2 MΩ cm$^{-1}$ water purified by a Milli-Q system (Synthesis A10, Millipore, Billerica, Mass.). All of the experiments were conducted at room temperature (22±1° C.).

Figure 5:
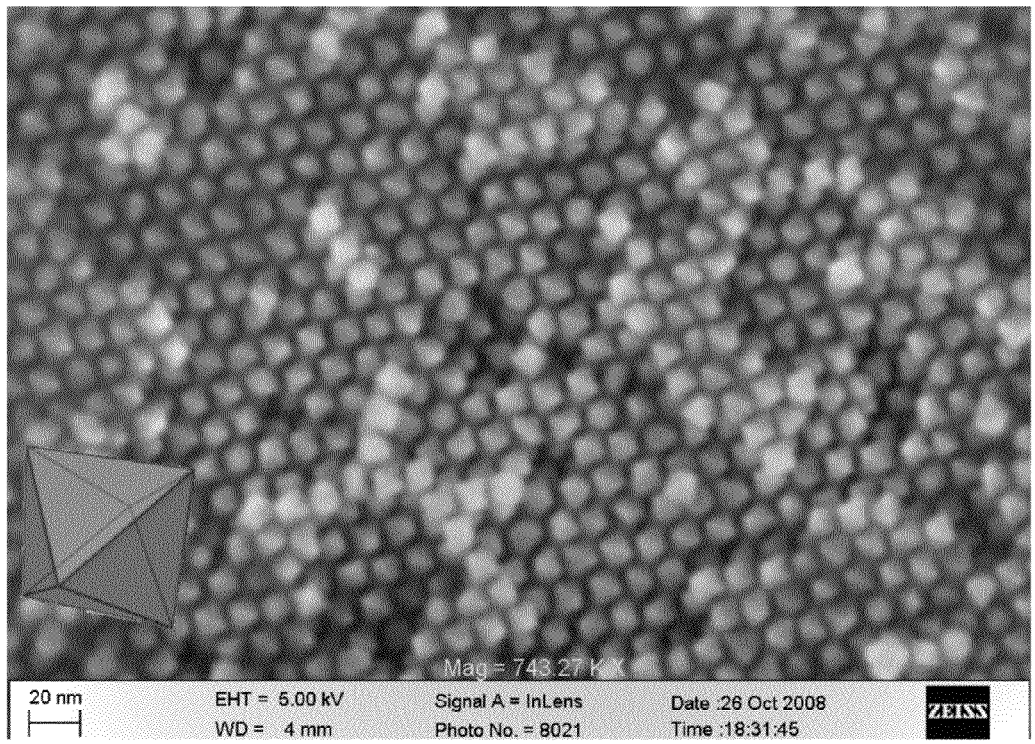
FIG. 5 shows a high-resolution SEM image of Pt$_3$Ni nanoctahedra that sit on a substrate by their {110} edges, showing that these nanoctahedra are monodisperse not only in size but also in shape.
Figures 6A, 6B:
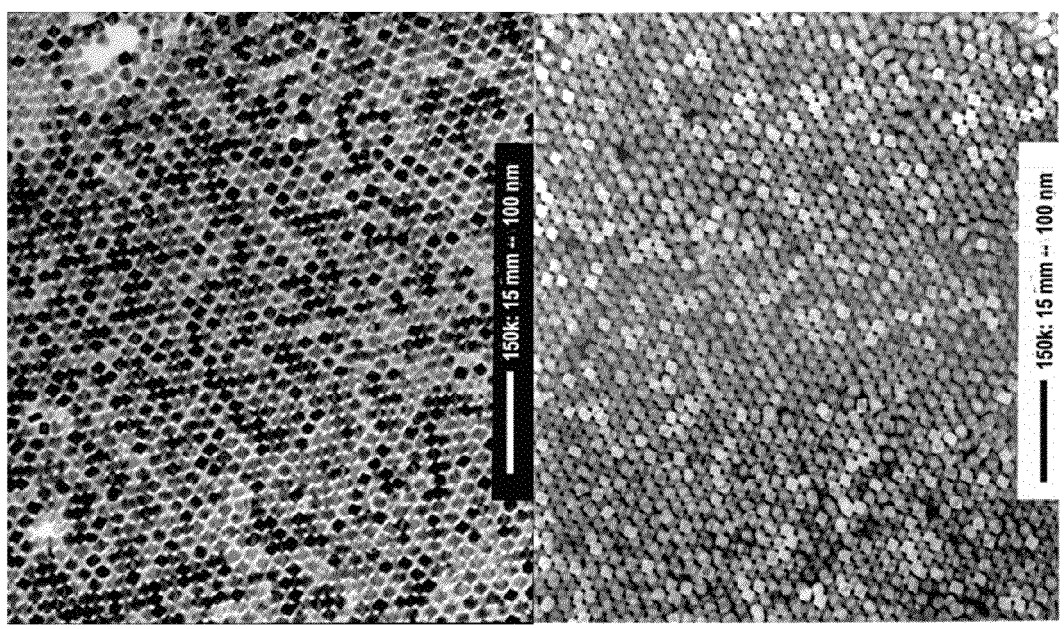
FIGS. 6A and 6B show typical TEM images of Pt$_3$Ni nanoctahedra that assemble on a grid by their {110} edges, further confirming their uniform size and shape.
Figure 7:
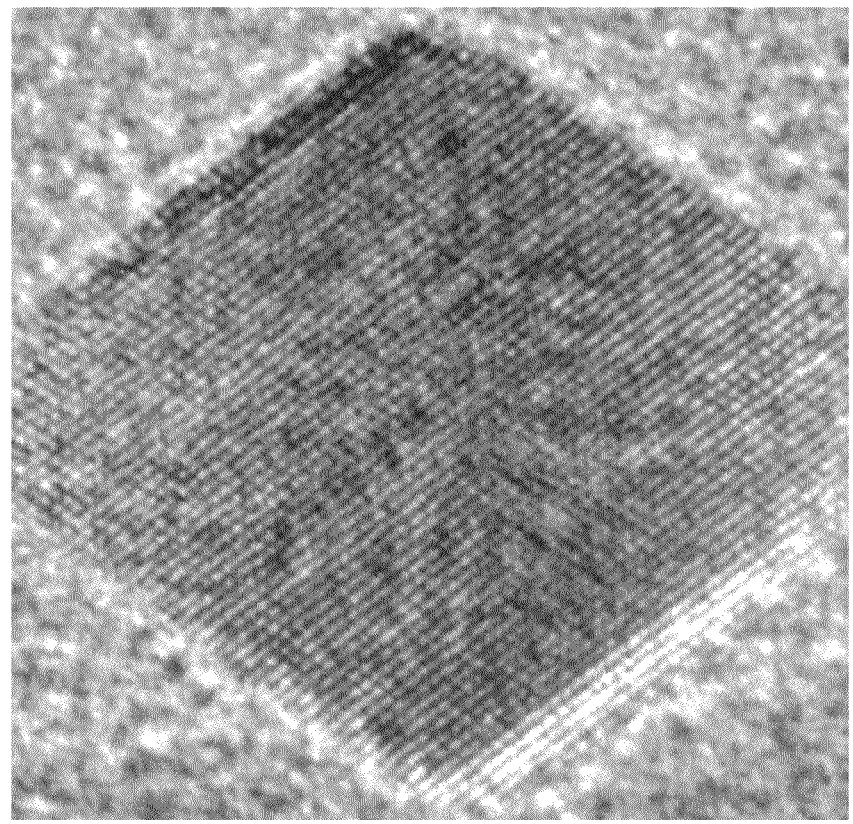
FIG. 7 shows a high-resolution TEM image of a Pt$_3$Ni nanoctahedron taken from a projection direction of {110}, showing that no abnormal morphology such as surface island, core-shell and distortion is observed.

The shape of these size-selected nanoctahedra was first determined using field-emission scanning electron microscopy (FE-SEM) as shown in FIG. 1A. High-resolution SEM image (FIG. 1B, also see FIG. 5) further reveals the feature of octahedral surfaces on these Nanocrystals (the octahedral model is shown in FIG. 1C). Due to the high uniformity in both size and shape, the Pt$_3$Ni nanoctahedra can be assembled into a multilayered superlattice with characteristic dimensions on the order of micrometers. FIG. 1D (also see FIGS. 6A and 6B) presents a transmission electron microscopic (TEM) image of a multilayer Pt$_3$Ni pattern, further confirming the octahedral morphology. The arrays of rhombus projection images clearly indicate that all of the octahedral Nanocrystals are patterned on the grid (also on the SEM substrate) in [110] projected orientation with an average side-length of ~10.6±0.3 nm.[32]$^3$ FIG. 1E (also see FIG. 7) is a high-resolution TEM (HRTEM) image taken from a projection direction of {110}, showing a {111}-d-spacing of ~2.23 Å which corresponds well with the lattice spacing of Pt$_3$Ni {110}. No distortion with crystal cores was observed from the HRTEM image. These observations imply that the Nanocrystals are dominated by {111}-terminated faces. To further confirm the chemical composition, ICP-MS and EDS analyses (from both TEM and SEM) were conducted, and the results suggest that the average molar ratio between Pt and Ni is 3:1.[40] FIG. 1F illustrates an SEM image of Pt$_3$Ni nanocube monolayer-assembly. The pattern is {100}-textured, flat on top surface and on the order of tens of micrometers. The {100}-perfect orientation can be further verified by the HRSEM (FIG. 1G) as well as the XRD pattern (vide infra). As shown in FIG. 1H, the projection image of such a cubic model should be a square. FIG. 1I demonstrates a typical TEM image of the Pt$_3$Ni nanocubes. The average side-length of these selected nanocubes was measured[52] as ~10.3±0.3 nm HRTEM image of a selected Pt$_3$Ni nanocube (FIG. 1J) reveals a highly crystalline cube with clearly resolved lattice fringes with a {200}-d-spacing of ~1.94 Å. Composition analyses of this sample show that the average molar ratio of Pt/Ni is 3:1.[40]

Figure 2:
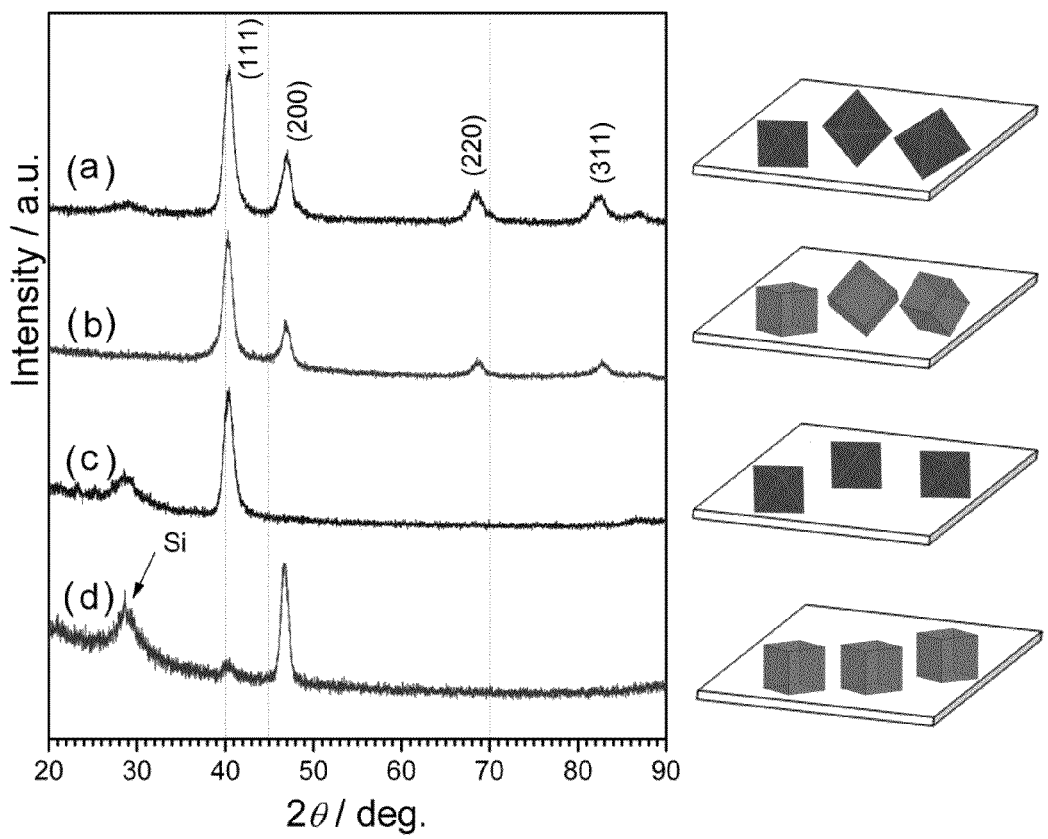
FIGS. 2A-2D show X-ray diffraction XRD patterns of Pt$_3$Ni Nanocrystals.

To further examine the microstructures of these Nanocrystals, X-ray diffraction (XRD) patterns were recorded and presented in FIGS. 2A and 2B. When both nanoctahedral (FIG. 2A) and nanocubic (FIG. 2B) samples were randomly deposited on a PANalytical Si-zero-background sample holder, similar diffraction patterns were obtained and they are indexed as that of Pt$_3$Ni based on the previous reports.[53, 54] However, assembly of each sample on a surface-polished Si-wafer results in an apparent enhancement on either peak {111} (for nanoctahedra, FIG. 2C) or peak (200) (for nanocubes, FIG. 2D)[55] and the absence of other peaks. As discussed previously,[37, 50, 56, 57] this observation in macroscale further supports the conclusion from the TEM studies, indicating that nanoctahedra and nanocubes, which are perfectly terminated with {111} and {100} facets, are the dominant shapes in the two samples, respectively.

Figure 8:
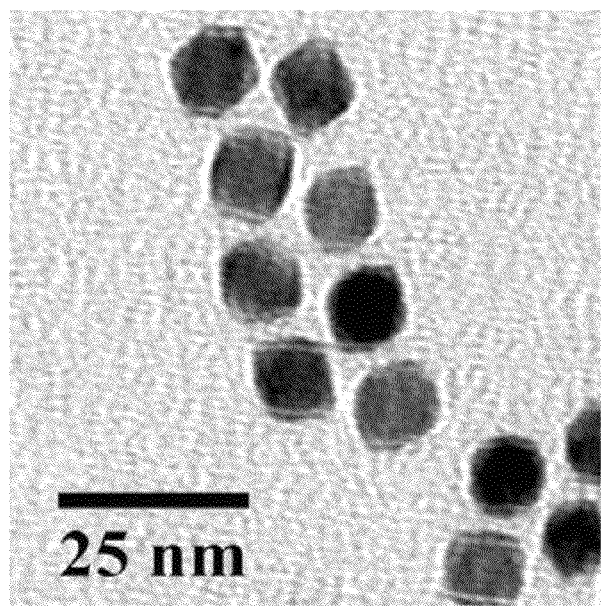
FIG. 8 shows a typical TEM image of Pt$_3$Ni nanoctahedra after argon plasma and electrochemical treatment, demonstrating that the octahedral morphology was largely retained. Most of the nanoctahedra sit on the grid by their {111} facets.
Figure 9:
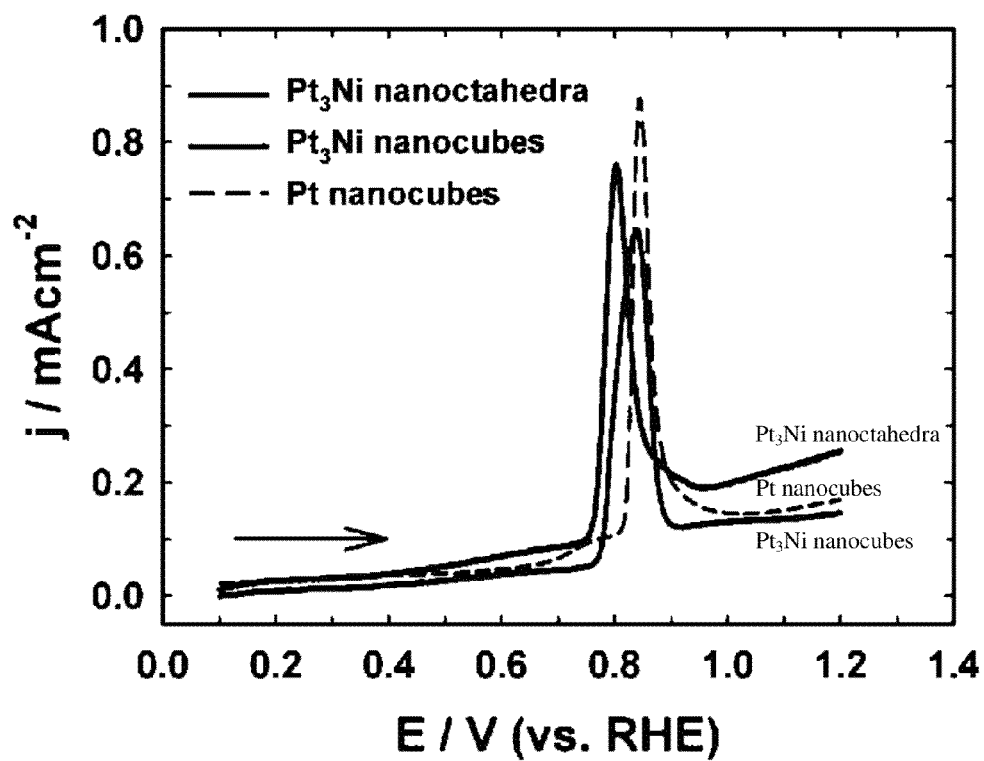
FIG. 9 shows CO stripping voltammograms from Pt$_3$Ni nanoctahedra, Pt$_3$Ni nanocube and Pt nanocube in N$_2$ saturated 0.1 M HClO$_4$ solution. The irreversibly adsorbed CO layer was formed by immersing the electrode in CO-saturated 0.1 M HClO$_4$ at 0.2 V for 5 min., followed by purging N$_2$ into the solution to remove the dissolved CO. Scan rate: 100 mV s$^{-1}$.
Figure 10A:
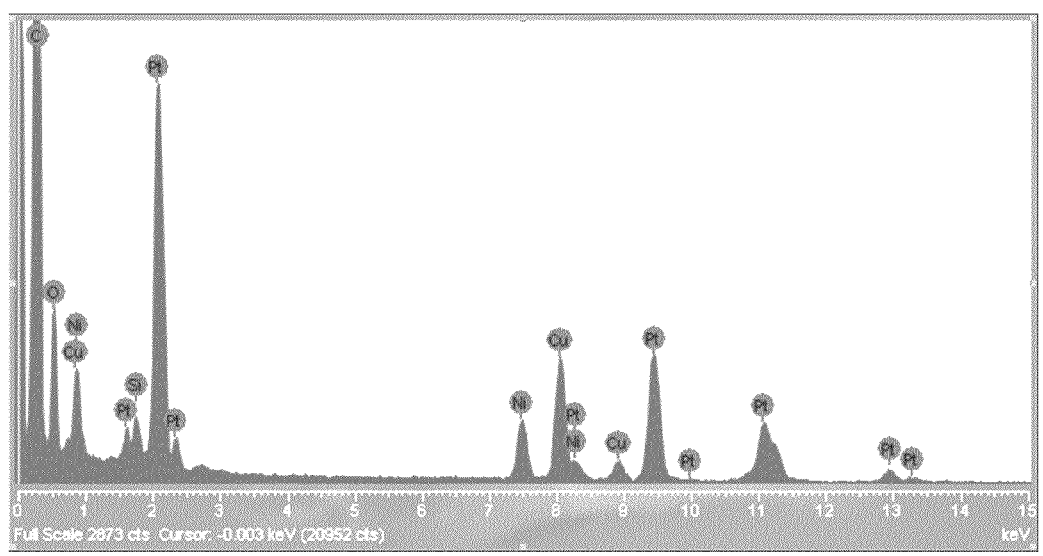

In order to evaluate their electrocatalytic activities, the Nanocrystals were coated on a glassy carbon electrode using a spin-coating method (See SI for detailed information). Before ORR kinetics measurements, these Nanocrystals were subjected to potential cycling between 0.05 and 1.0 V (versus a reversible hydrogen electrode, RHE) for 20 to 25 cycles in 0.1 M HClO$_4$ to further clean the particle surface. As indicated in FIG. 8, no obvious change of particle morphology was observed in their TEM projection image after this potential cycling treatment on the Pt$_3$Ni nanoctahedra. Unlike conventional spherical Pt—Ni Nanocrystals without shape control, these Nanocrystals are remarkably stable against the leaching of Ni. After the electrochemical measurements, Pt/Ni molar ratio remains unchanged, as revealed by the ICP-MS measurements. The resultant final voltammograms are shown in FIG. 3. For Pt$_3$Ni nanoctahedra, the current responses from hydrogen adsorption/desorption processes appear in the potential range of 0.05 to 0.30 V. The peak position and shape resemble those of the extended Pt$_3$Ni {111} surface prepared under ultrahigh vacuum (UHV), which is covered with a Pt skin.[22] Similarly, a pair of hydrogen adsorption/desorption peaks at ~0.23 V are close to those observed on the extended Pt$_3$Ni {100} surface, which is also Pt-rich.[22] On Pt nanocubes, two pairs of hydrogen adsorption/desorption peaks at ~0.27 V and ~0.37 V, respectively, clearly suggest the dominance of {100} facet on Pt nanocubes.[58] In addition, the negative shift of the hydrogen adsorption/desorption peaks on Pt$_3$Ni nanocubes with respect to those on Pt nanocubes is similar to that on the corresponding extended Pt$_3$Ni {100} and Pt{100} surfaces.[22] These observations suggest that the NC surfaces are Pt-rich. The presence of Pt-rich outermost layer is further supported by using surface sensitive carbon monoxide (CO) electro-oxidation, which shows that the CO oxidation peak in the stripping voltammograms obtained on Pt$_3$Ni nanoctahedra and nanocubes nearly overlaps with that on Pt cubes (FIG. 9). If there was a significant amount of Ni on the surface, the CO stripping peak would be much more negative than that on the pure Pt.[59] The fidelity of using either hydrogen adsorption/desorption or CO stripping peak positions to confirm the particle surface structure have been extensively shown by others for Pt single crystal surfaces and nanoparticles.[60-63] Monte Carlo simulations [25] suggested that 98% of the outermost layer of Pt$_3$Ni octahedral Nanocrystals contains Pt, and nearly 70% of the second layer consists of Ni. Our determination of the Pt-rich particle surface is in agreement with this prediction.

To examine the effect of different crystal facets on the ORR kinetics, rotating disk electrode (RDE) voltammetry was used. The ORR measurements were conducted in an $O_2$-saturated 0.1 M $HClO_4$ solution at 295 K. A characteristic set of polarization curves for the ORR on $Pt_3Ni$ nanoctahedra, $Pt_3Ni$ nanocubes, and Pt nanocubes are displayed in FIG. 4A. Two distinguishable potential regions were clearly observed in the polarization curves: the well-defined diffusion-limiting current region from 0.18 to ~0.7 V and the mixed kinetic-diffusion control region between ~0.8 and 1.0 V. From FIG. 4A, it is apparent that the half-wave potential of ORR on the $Pt_3Ni$ nanoctahedra is ~45 mV more positive than that of the $Pt_3Ni$ nanocubes, and both are much more positive than that of Pt nanocubes, suggesting the ORR activity is strongly dependent on the particle shape and the composition. After the mass transport correction, the specific activity, that is, the current density with respect to the electrochemically active Pt surface area at 0.9 V, of $Pt_3Ni$ nanoctahedra is 5.1 times of that of the $Pt_3Ni$ nanocubes and ~6.5 times of that of the Pt nanocubes (FIG. 4B). The electrochemically active Pt surface area was estimated from the charges involved in desorption of the underpotentially deposited hydrogen ($H_{UPD}$) on NC surface.[20, 64, 65] Similarly, the mass activity measured as the current at 0.9 V normalized to the Pt mass of the $Pt_3Ni$ nanoctahedra is ~2.8 times of that of $Pt_3Ni$ nanocubes, and ~3.6 times of that of Pt nanocubes. The significant shape-dependent ORR activity agrees with the observation from the extended $Pt_3Ni$ single crystal surfaces,[22] where the activity increases in the following order: $Pt_3Ni\{100\}<Pt_3Ni\{110\}<<Pt_3Ni\{111\}$. Compared with the extended $Pt_3Ni\{111\}$ and $Pt_3Ni\{100\}$ surfaces, the specific activity observed on $Pt_3Ni$ nanoctahedra and nanocubes are about four to seven-fold smaller, which is in general agreement with the notion that the ORR activity of Pt nanoparticle catalysts is 5 to 10 times smaller than the extended Pt surfaces.[22] The activity improvement of $Pt_3Ni$ nanocubes over Pt nanocubes is small (FIG. 4B), which is similar to that of the extended $Pt_3Ni\{100\}$ and $Pt\{100\}$ surfaces.[22]

Figure 11:
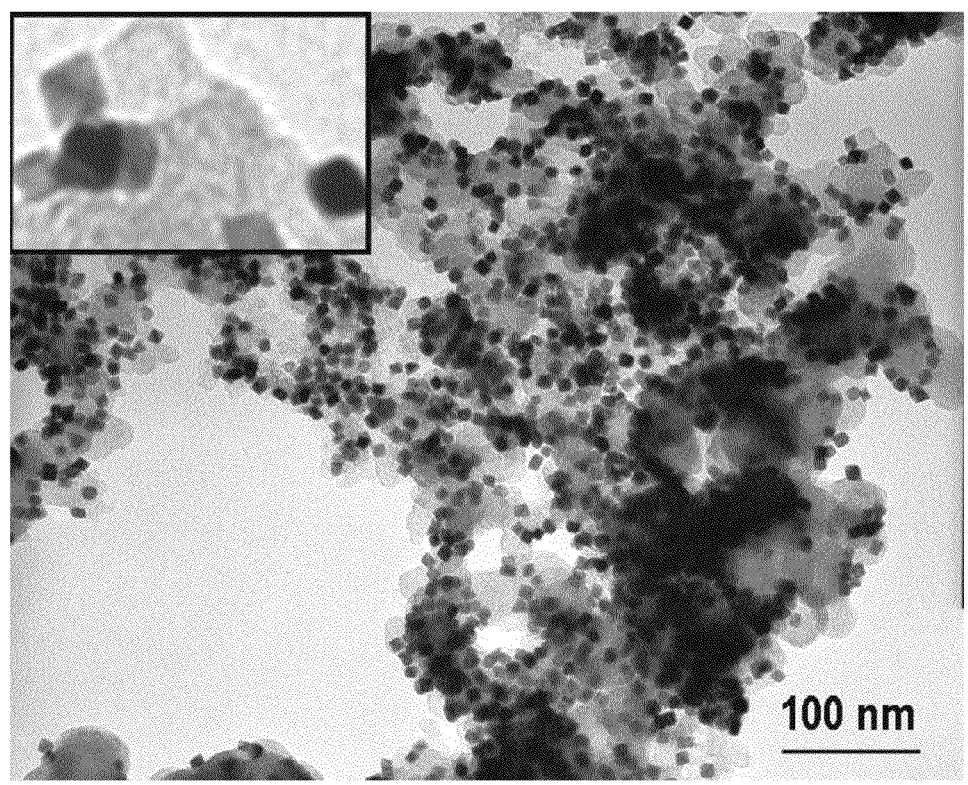
FIG. 11 shows a TEM image of carbon black-supported Pt$_3$Ni nanoctahedron catalysts (Pt3Ni-octa/C).
Figure 12:
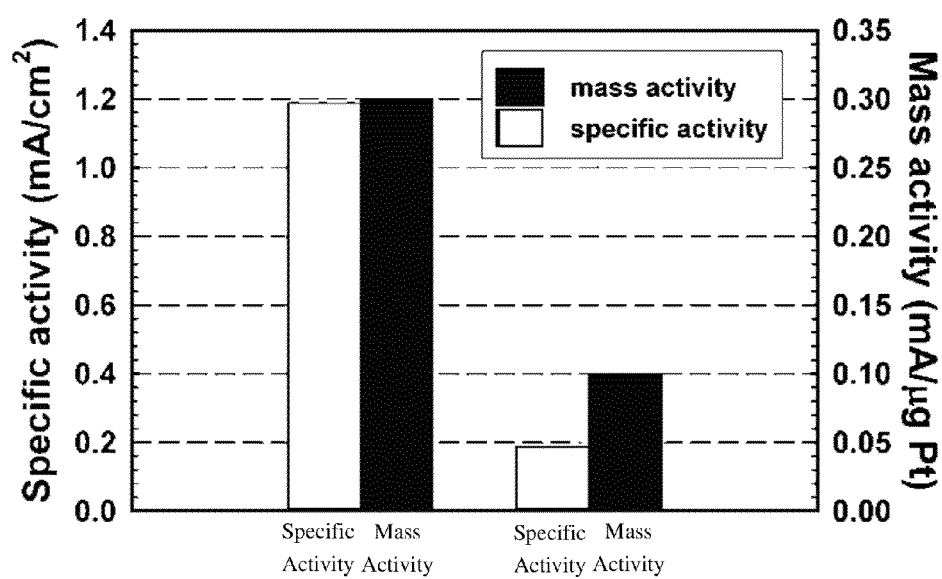
FIG. 12 shows a comparison of the ORR activities of carbon black-supported Pt$_3$Ni nanoctahedra (Pt$_3$Ni-octa/C) and commercial Pt/C. Specific activity and mass activity were all measured at 0.9 V versus RHE at 295 K.
Figure 13:
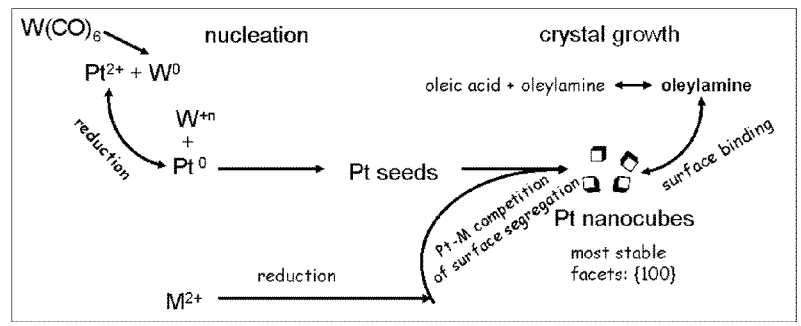
FIG. 13 shows an illustration of both nucleation and crystal growth processes for Pt$_3$M nanocubes (M=Co, Fe and Ni).
Figure 14:
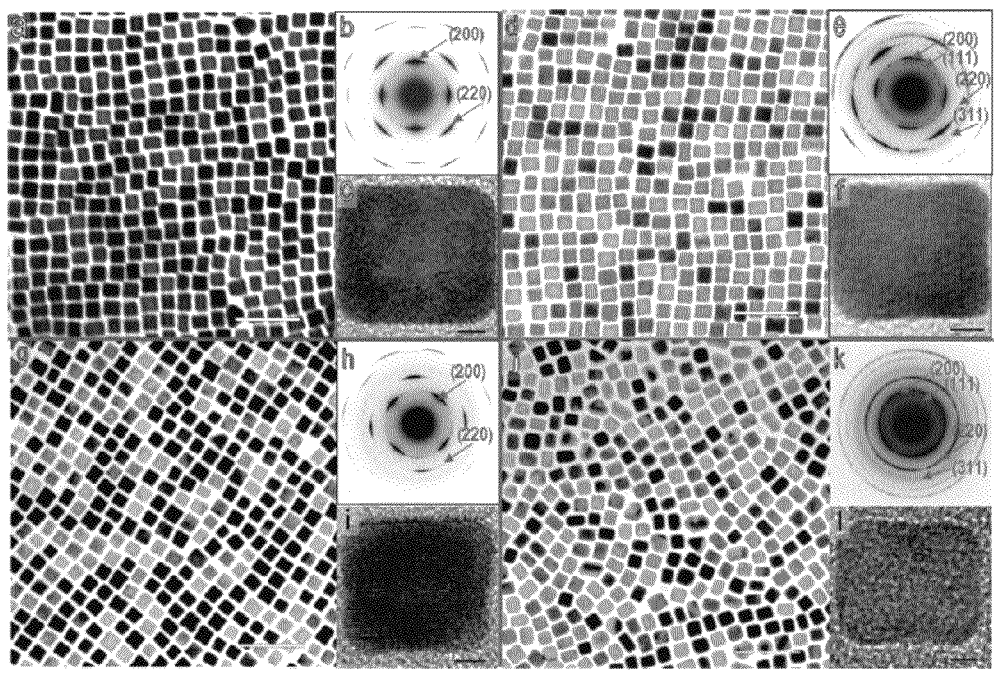
FIGS. 14A-14L show TEM images and diffraction patterns.

ORR activity strongly depends on the terminal facets of $Pt_3Ni$ Nanocrystals. The $\{111\}$-facet-terminated nanoctahedra are significantly more active than the $\{100\}$-bounded nanocubes, suggesting that controlling the shape of nanocatalyst may be an effective way to improve ORR activity and to develop highly active electrocatalysts used in the real world. See FIG. 13. To compare their $O_2$ reduction performance with commercially available Pt/C catalysts, the $Pt_3Ni$ nanoctahedra were supported on carbon black (designated as $Pt_3Ni$-octa/C, FIG. 11). The specific and mass activity of $Pt_3Ni$-octa/C is 6.3 and 3 times, respectively, higher than those of the commercial Pt/C catalysts (FIG. 12), although the size of the $Pt_3Ni$ nanoctahedra is ~3 times larger. This suggests that a higher ORR activity on $Pt_3Ni$ nanoctahedra could be obtained by reducing particle size. Furthermore, the shape-dependent ORR activity likely exists on other metallic catalysts. The shape-controlled strategy reported herein may be extended to the syntheses of other nonprecious metal-Pt nanopolyhedral alloys, which are candidates of highly active fuel cell catalysts.

REFERENCES AND NOTES

Incorporated Herein by Reference (1) Dresselhaus, M. S.; Thomas, I. L. *Nature* 2001, 414, 332-337.
(2) Winter, M.; Brodd, R. *J. Chem. Rev.* 2004, 104, 4245-4270.
(3) Vielstich, W.; Lamm, A.; Gasteiger, H. A. *Handbook of Fuel Cells: Fundamentals, Technology, Applications*; Wiley: New York, 2003.
(4) Wang, C.; Daimon, H.; Onodera, T.; Koda, T.; Sun, S. *Angew. Chem. Int. Ed.* 2008, 47, 3588-3591.
(5) Ren, J.; Tilley, R. D. *J. Am. Chem. Soc.* 2007, 129, 3287-3291.
(6) Gasteiger, H. A.; Kocha, S. S.; Sompalli, B.; Wagner, F. T. *Appl. Catal. B* 2005, 56, 9-35.
(7) Peng, Z.; Yang, H. *J. Am. Chem. Soc.* 2009, 131, 7542-7543.
(8) Lim, B.; Jiang, M.; Camargo, P. H. C.; Cho, E. C.; Tao, J.; Lu, X.; Zhu, Y.; Xia, Y. *Science* 2009, 324, 1302-1305.
(9) Adzic, R. R.; Zhang, J.; Sasaki, K.; Vukmirovic, M. B.; Shao, M.; Wang, J. X.; Nilekar, A. U.; Mavrikakis, M.; Valerio, J. A.; Uribe, F. *Top. Catal.* 2007, 46, 249-262.
(10) Stamenkovic, V.; Mun, B. S.; Mayrhofer, K. J. J.; Ross, P. N.; Markovic, N.; Rossmeisl, J.; Greeley, J.; Nørskov, J. K. *Angew. Chem. Int. Ed.* 2006, 45, 2897-2901.
(11) Stamenkovic, V. R.; Mun, B. S.; Arenz, M.; Mayrhofer, K. J. J.; Lucas, C. A.; Wang, G.; Ross, P. N.; Markovic, N. M. *Nat. Mater.* 2007, 6, 241-247.
(12) Mukerjee, S.; Srinivasan, S.; Soriaga, M. P. *J. Electrochem. Soc.* 1995, 142, 1409-1422.
(13) Watanabe, M.; Tsurumi, K.; Mizukami, T.; Nakamura, T.; Stonehart, P. *J. Electrochem. Soc.* 1994, 141, 2659-2668.
(14) Koh, S.; Leisch, J.; Toney, M. F.; Strasser, P. *J. Phys. Chem. C* 2007, 111, 3744-3752.
(15) Mukerjee, S.; Srinivasan, S. *J. Electroanal. Chem.* 1993, 357, 201-224.
(16) Stamenkovic, V.; Schmidt, T. J.; Ross, P. N.; Markovic, N. M. *J. Electroanal. Chem.* 2003, 554-555, 191-199.
(17) Koh, S.; Strasser, P. *J. Am. Chem. Soc.* 2007, 129, 12624-12625.
(18) Xu, D.; Liu, Z.; Yang, H.; Liu, Q.; Zhang, J.; Fang, J.; Zou, S.; Sun, K. *Angew. Chem. Int. Ed.* 2009, 48, 4217-4221.
(19) Stamenkovic, V.; Schmidt, T. J.; Ross, P. N.; Markovic, N. M. *J. Phys. Chem. B* 2002, 106, 11970-11979.
(20) Paulus, U. A.; Wokaun, A.; Scherer, G. G.; Schmidt, T. J.; Stamenkovic, V.; Radmilovic, V.; Markovic, N. M.; Ross, P. N. *J. Phys. Chem. B* 2002, 106, 4181-4191.
(21) Serov, A.; Kwak, C. *Appl. Catal. B* 2009, 90, 313-320.
(22) Stamenkovic, V. R.; Fowler, B.; Mun, B. S.; Wang, G.; Ross, P. N.; Lucas, C. A.; Markovic, N. M. *Science* 2007, 315, 493-497.
(23) Chen, M.; Goodman, W. D. *Chem. Soc. Rev.* 2008, 37, 1860-1870.
(24) Somorjai, G. A.; Park, J. Y. *Chem. Soc. Rev.* 2008, 37, 2155-2162.
(25) Fowler, B.; Lucas, C. A.; Omer, A.; Wang, G.; Stamenkovic, V. R.; Markovic, N. M. *Electrochem. Acta* 2008, 53, 6076-6080.
(26) Higuchi, E.; Uchida, H.; Watanab, M. J. *Electroanal. Chem.* 2005, 583, 69-76.
(27) Murray, C. B.; Kagan, C. R.; Bawendi, M. G. *Annu. Rev. Mater. Sci.* 2000, 30, 545-610.
(28) Xiong, Y.; Xia, Y. *Adv. Mater.* 2007, 19, 3385-3391.
(29) Zhang, J.; Sun, K.; Kumbhar, A.; Fang, J. *J. Phys. Chem. C* 2008, 112, 5454-5458.
(30) Wang, Z. L. *J. Phys. Chem. B* 2000, 104, 1153-1175.
(31) Liu, Q.; Lu, W.; Ma, A.; Tang, J.; Lin, J.; Fang, J. *J. Am. Chem. Soc.* 2005, 127, 5276-5277.
(32) Lu, W.; Liu, Q.; Sun, Z.; He, J.; Ezeolu, C.; Fang, J. *J. Am. Chem. Soc.* 2008, 130, 6983-6991.

(33) Qian, C.; Kim, F.; Ma, L.; Tsui, F.; Yang, P.; Liu, J. *J. Am. Chem. Soc.* 2004, 126, 1195-1198.
(34) Lu, W.; Gao, P.; Jian, W. B.; Wang, Z. L.; Fang, J. *J. Am. Chem. Soc.* 2004, 126, 14816-14821.
(35) Chen, J.; Herricks, T.; Xia, Y. *Angew. Chem. Int. Ed.* 2005, 44, 2589-2592.
(36) Song, H.; Kim, F.; Connor, S.; Somorjai, G. A.; Yang, P. *J. Phys. Chem. B* 2005, 109, 188-193.
(37) Chen, M.; Kim, J.; Liu, J. P.; Fan, H.; Sun, S. *J. Am. Chem. Soc.* 2006, 128, 7132-7133.
(38) Xiong, L.; He, T. *Electrochem. Commun.* 2006, 8, 1671-1676.
(39) Alexeev, O.; Shelef, M.; Gates, B. C. *J. Catal.* 1996, 164, 1-15.
(40) The compositions of both octahedral and cubic samples were evaluated using ICP-MS, EDS-SEM and EDS-TEM methods. For nanoctahedra, the average molar ratio of Pt:Ni was determined as 67:33, 70:30 and 76:49 from three methods, respectively. For nanocubes, it was 71:29, 75:25 and 76:61 (FIG. 10A-10D). Content of W was determined as zero from both samples using any of the above methods.
(41) Vanysek, P. In *CRC Handbook of Chemistry and Physics*; Lide, D. R., Ed.; CRC Press: Boca Raton, Fla., 2006; Vol. 87th, pp 8/20-28/29.
(42) Chen, J.; Herricks, T.; Geissler, M.; Xia, Y. *J. Am. Chem. Soc.* 2004, 126, 10854-10855.
(43) Grätzel, M. *Nature* 2001, 414, 338-344.
(44) Zhang, J.; Fang, J. *J. Am. Chem. Soc.* 2009, 131, 18543-18547, dx.doi.org/10.1021/ja908245r.
(45) Kitchin, J. R.; Nørskov, J. K.; Barteau, M. A.; Chen, J. G. *J. Chem. Phys.* 2004, 120, 10240-10246.
(46) Mun, B. S.; Watanabe, M.; Rossi, M.; Stamenkovic, V.; Markovic, N. M.; P. N. Ross, *J. Surf. Rev. Lett.* 2006, 13, 697-702.
(47) Mun, B. S.; Watanabe, M.; Rossi, M.; Stamenkovic, V.; Markovic, N. M.; Jr., P. N. R. *J. Chem. Phys.* 2005, 123, 204717/204711-204717/204714.
(48) Lee, S.-M.; Jun, Y.-w.; Cho, S.-N.; Cheon, J. *J. Am. Chem. Soc.* 2002, 124, 11244-11245.
(49) Tian, N.; Zhou, Z.-Y.; Sun, S.-G.; Ding, Y.; Wang, Z. L. *Science* 2007, 316, 732-735.
(50) Wang, C.; Daimon, H.; Lee, Y.; Kim, J.; Sun, S. *J. Am. Chem. Soc.* 2007, 129, 6974-6975.
(51) Deivaraj, T. C.; Chen, W.; Lee, J. Y. *J. Mater. Chem.* 2003, 13, 2555-2560.
(52) To minimize the measurement error, diagonal of each projected image was measured and its equivalent side-length was subsequently calculated based on the assumption that the projection image of each nanocrystal is exactly square.
(53) Ahrenstorf, K.; Heller, H.; Kornowski, A.; Broekaert, J. A. C.; Weller, H. *Adv. Funct. Mater.* 2008, 18, 3850-3856.
(54) Ahrenstorf, K.; Albrecht, O.; Heller, H.; Kornowski, A.; Gçrlitz, D.; Weller, H. *Small* 2007, 3, 271-274.
(55) A trace at peak {111} indicates the minor "impurity" of nanoctahedra as described in the synthesis section.
(56) Lu, W.; Fang, J.; Stokes, K. L.; Lin, J. *J. Am. Chem. Soc.* 2004, 126, 11798-11799.
(57) Zhang, J.; Kumbhar, A.; He, J.; Das, N.C.; Yang, K.; Wang, J.-Q.; Wang, H.; Stokes, K. L.; Fang, J. *J. Am. Chem. Soc.* 2008, 130, 15203-15209.
(58) Solla-Gullòn, J.; Vidal-Iglesias, F. J.; Lòpez-Cudero, A.; Garnier, E.; Feliu, J. M.; Aldaz, A. *Phys. Chem. Chem. Phys* 2008, 10, 3689-3698.
(59) Mayrhofer, K. J. J.; Juhart, V.; Hard, K.; Hanzlik, M.; Arenz, M. *Angew. Chem. Int. Ed.* 2009, 48, 3529-3531.
(60) Clavilier, J. In *Interfacial Electrochemistry*; Wieckowski, A., Ed.; Marcel Dekker: Oxford, 1999.
(61) Solla-Gullón, J.; Vidal-Iglesias, F. J.; Herrero, E.; Feliu, J. M.; Aldaz, A. *Electrochem. Commun.* 2006, 8, 189-194.
(62) Solla-Gullón, J.; Rodríguez, P.; Herrero, E.; Aldaz, A.; Feliu, J. M. *Phys. Chem. Chem. Phys* 2008, 10, 1359-1373.
(63) Lee, H.; Habas, S. E.; Kweskin, S.; Butcher, D.; Somorjai, G. A.; Yang, P. *Angew. Chem. Int. Ed.* 2006, 45, 7824-7828.
(64) Markovic, N. M.; Gasteiger, H. A.; Ross, P. N. *J. Phys. Chem.* 1996, 100, 6715-6721.
(65) Mayrhofer, K. J. J.; Strmcnik, D.; Blizanac, B. B.; Stamenkovic, V.; Arenz, M.; Markovic, N. M. *Electrochem. Acta* 2008, 53, 3181-3188.

Example 2

Synthesis Details

Synthesis of Pt NCbs.

0.020 g of platinum (II) acetylacetonate, 8.0 mL of oleylamine and 2.0 mL of oleic acid were loaded into a three-neck flask equipped with a condenser and attached to a Schlenk line. The mixture was heated to 130° C. with vigorous stirring under an argon stream. 0.05 g of tungsten hexacarbonyl was then added into the solution and the temperature was subsequently raised to 240° C. and kept for 30-60 min with a vigorous agitation. The resultant products were isolated by centrifugation and washed with anhydrous hexane for several cycles, followed by a size-selection treatment. The Pt NCbs were finally re-dispersed in hexane, forming a colloidal suspension.

Synthesis of $Pt_3Co$ NCbs.

0.0125 g of cobalt acetate tetrahydrate, 0.020 g of platinum (II) acetylacetonate, 8.0 mL of oleylamine and 2.0 mL of oleic acid were loaded into a three-neck flask equipped with a condenser and attached to a Schlenk line. The mixture was heated to 130° C. with vigorous stirring under an argon stream. 0.05 g of tungsten hexacarbonyl was then added into the solution and the temperature was subsequently raised to 240° C. and kept for 30-60 min with a vigorous agitation. The isolation procedure is the same as above.

Synthesis of $Pt_3Fe$ NCbs.

0.010 g of iron (II) chloride tetrahydrate, 0.020 g of platinum (II) acetylacetonate, 8.0 mL of oleylamine and 2.0 mL of oleic acid were loaded into a three-neck flask equipped with a condenser and attached to a Schlenk line. The mixture was heated to 130° C. with vigorous stirring under an argon stream. 0.05 g of tungsten hexacarbonyl was then added into the solution and the temperature was subsequently raised to 240° C. and kept for 30-60 min with a vigorous agitation. The isolation procedure is the same as that of Pt NCbs.

Synthesis of $Pt_3Ni$ NCbs.

Under airless condition, platinum (II) acetylacetonate (20 mg, 0.05 mmol), oleylamine (9.0 mL) and oleic acid (1.0 mL) were loaded into a three-neck flask under an argon stream. Once the system was heated to 130° C., tungsten hexacarbonyl (50 mg, 0.14 mmol) was then added into the vigorously stirred solution. Subsequently, a stock solution of Ni-precursors (0.4 mL, 0.04 mmol), which was pre-prepared by dissolving 0.238 g of nickel (II) chloride hexahydride into a mixed solvents containing oleylamine (5.0 mL) and oleic acid (5.0 mL), was added dropwise within 15 min while the temperature was steadily raised from 130 to 200° C. The colloids were further evolved at 240° C. for additional 15 min. The isolation procedure is the same as that of Pt NCbs.

Figure 17A:
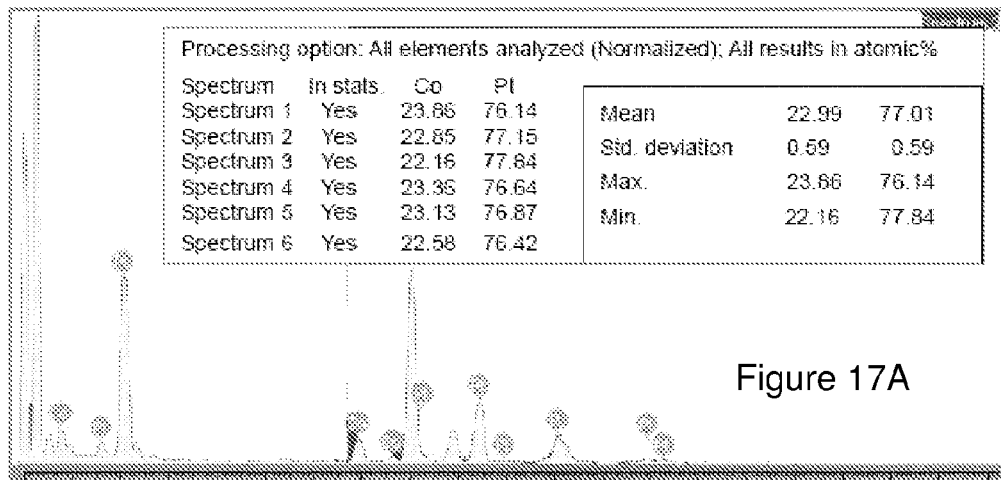
FIGS. 17A-17C show typical spectra of TEM-EDS analyses.
Figure 17B:
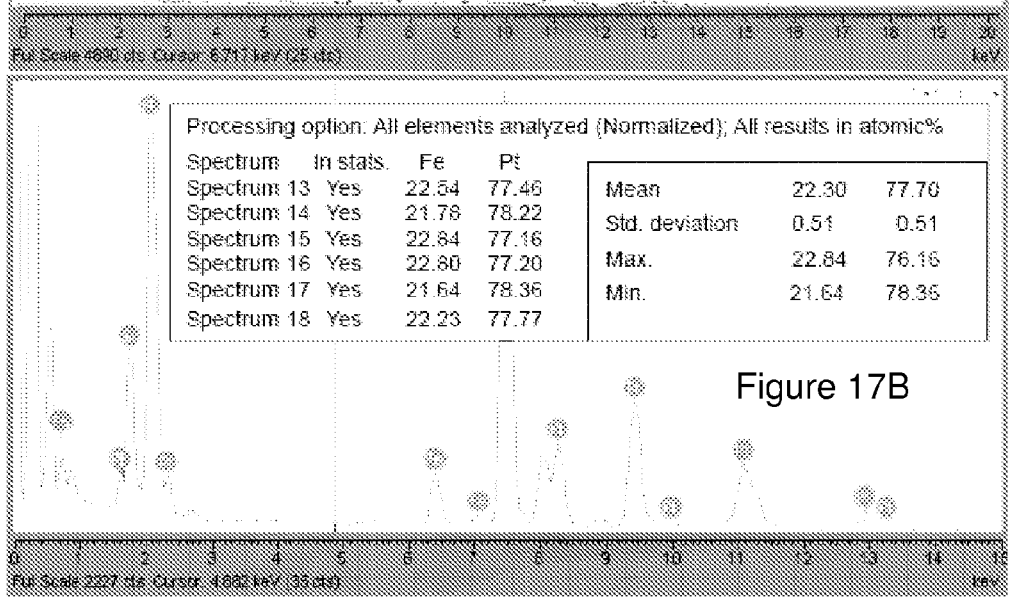
Figure 17C:
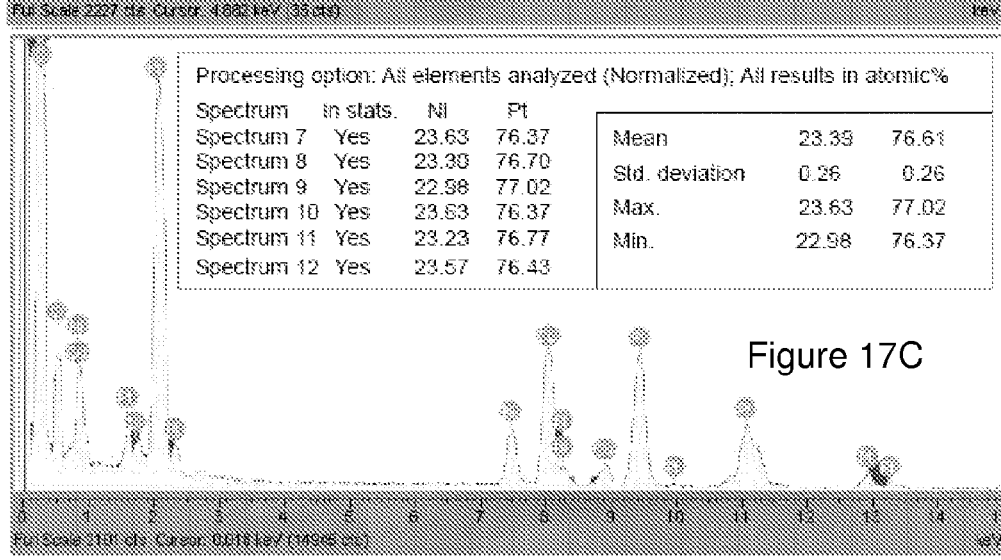
Figure 18:
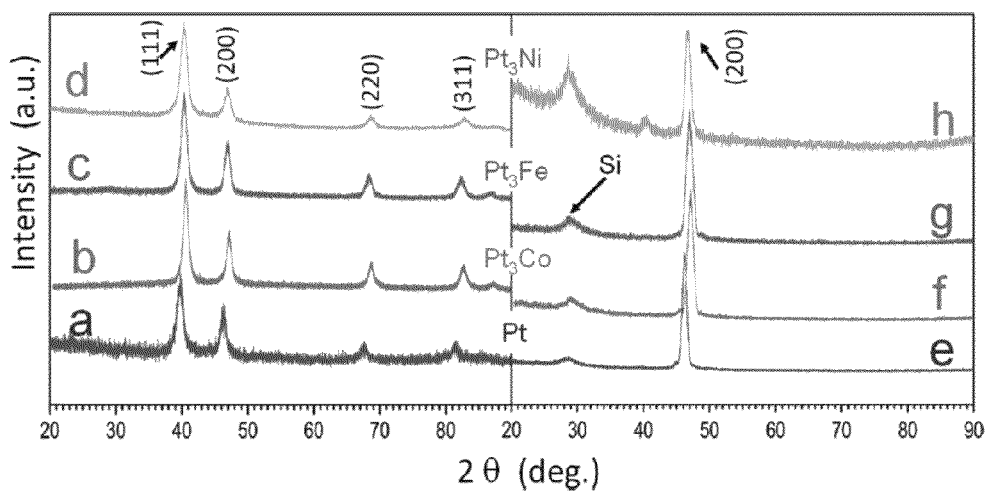
FIGS. 18A-18H show XRD pattern of Pt$_3$M nanocubes.

Typical transmission electron microscopic (TEM) images of the four typed NCbs are presented in FIGS. 14A-14L. FIG. 14A, 14D, 14G and 14J shows a perfect cubic morphology for each system and relatively high size-distribution (also refer to FIG. 15). On the basis of the TEM images of these Pt, $Pt_3Co$, $Pt_3Fe$ and $Pt_3Ni$ (II) NCbs, average side-lengths were determined as 8.1±0.6 nm, 9.1±0.5 nm, 7.9±0.6 nm and 8.1±0.6 nm, respectively. As depicted in FIGS. 14B, 14E, 14H and 14K, selected area electron diffraction (SAED) (negative) patterns of these NCbs were taken from about 150-200 Nanocrystals for each. The ring corresponding to the (200) plane in these SAED patterns of Pt, $Pt_3Co$, $Pt_3Fe$ exhibits four-fold symmetry, clearly indicating that these NC arrays are {100}-textured with a relatively long-range order. This observation is also supported by the facts that the {111} diffraction rings are very weak and the (222) rings are absent in the case of all four types of NCbs. FIGS. 14C, 14F, 14I and 14L presents high-resolution TEM (HRTEM) images of four types of individual Nanocubes from each alloy (also see FIGS. 16A-16D), indicating highly crystalline cubes with apparently resolved lattice fringes. The measured d-spacings, that is, 1.96 Å, 1.92 Å, 1.93 Å and 1.94 Å, are consistent with those of {200} for Pt, $Pt_3Co$, $Pt_3Fe$ lattice planes{18} and literature reports for $Pt_3Ni$,{19, 20} respectively. This reveals that not only are these Nanocubes perfectly {100}-oriented but the compositions of Pt—Co and Pt—Fe are also indirectly verified. In addition, no distortion with crystal cores was observed from these HRTEM images (see FIGS. 16A-16D). To explore the chemical compositions, typical samples of these binary alloys were analyzed using a TEM energy dispersive X-ray spectroscopic (TEM-EDS) technique, and the outcomes are generally in good agreement with our inductively coupled plasma mass spectroscopic (ICP-MS) and inductively coupled plasma atomic emission spectrophotometric (ICP-AES) results. As presented in FIGS. 17A-17C, the EDS evaluation suggests that the average molar ratios between Pt and M in three binary alloys are close to 3:1. We have also investigated the influence of the —Pt/-M precursor ratios on the composition of products. It seems that the compositions of Nanocubes can be slightly changed by varying the feed ratios between the —Pt and -M precursors. However, the influence is very insignificant. For example, increase of the (Fe) input molar ratio of —Fe/—Pt from 1:1 to 2:1 only leads to an increase of (Fe) molar ratio of Fe/Pt from 22.3:77.7 to 24.0:76.0 in the cubic products when the synthesis was carried out at 240° C.

To further confirm the microstructure of these NCbs, X-ray diffraction (XRD) patterns were recorded from all of the $Pt_3M$ samples and are presented in FIG. 18A-18D. By indexing these XRD patterns using standard ICDD PDF cards {18} and reported data,{19, 20} it is confirmed that the as-synthesized NCbs possess highly crystalline fcc Pt-phase with the $Fm\bar{3}m$ space group. Importantly, no diffraction signal of pure M and/or pure W was detected from all of the patterns, further suggesting that only a $Pt_3M$ single phase exists in each sample. It is worth noting that when these NCbs were carefully deposited on a surface-polished Si wafer, as reported previously,{1, 21, 22} the resultant XRD pattern of each sample only shows a much enhanced (200) peak (FIGS. 18E-18H), indicating that these $Pt_3M$ NCbs align perfectly flat on the surface of the substrates with {100}-texture. In comparison with the XRD patterns of the same $Pt_3M$ cubic samples randomly deposited on a regular XRD holder/substrate (FIGS. 18A-18D), this peak (200)-enhanced XRD observation further supports the fact that the $Pt_3M$ NCbs have a {100}-dominated cubic morphology with very narrow shape distributions.

Figure 19:
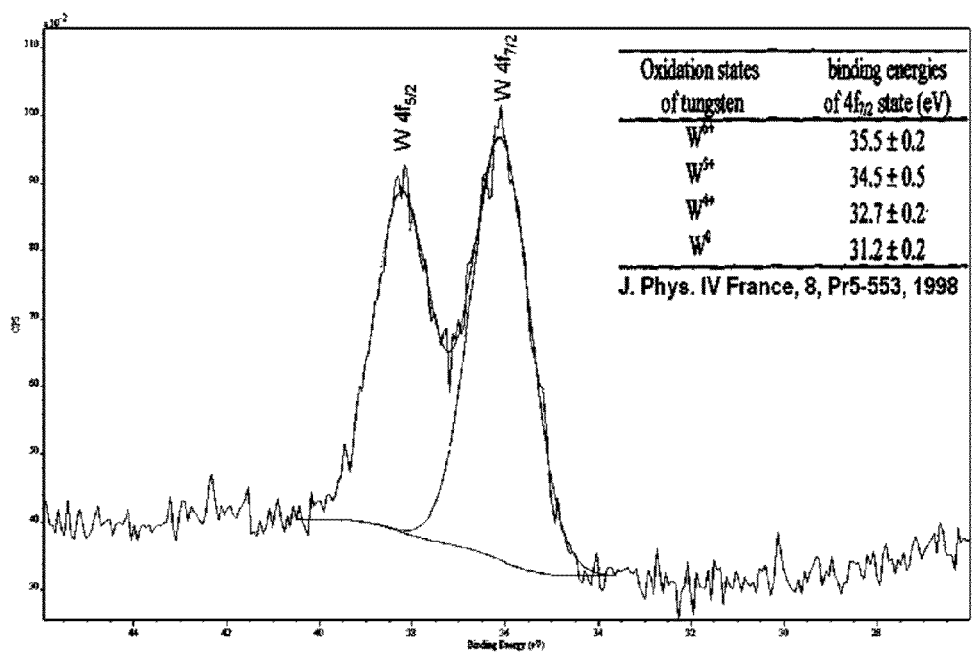
FIG. 19 shows an XPS spectrum of the residual solution after Pt$_3$Fe nanocube synthesis.
Figure 20A:
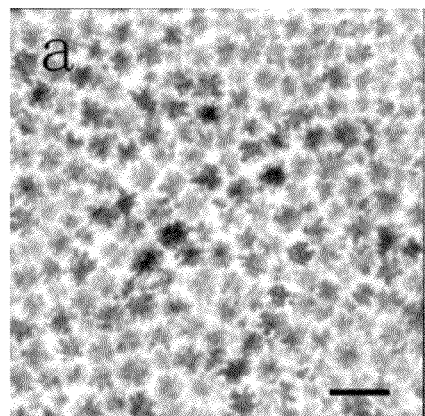
Figure 20B:
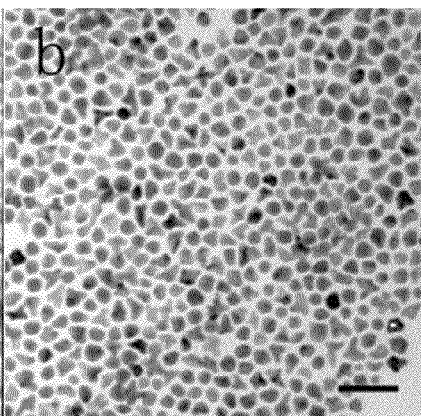
Figure 20C:
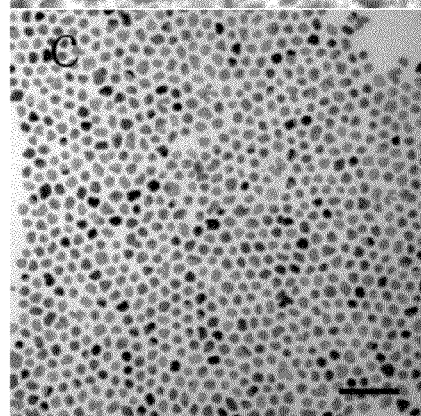
Figure 20D:
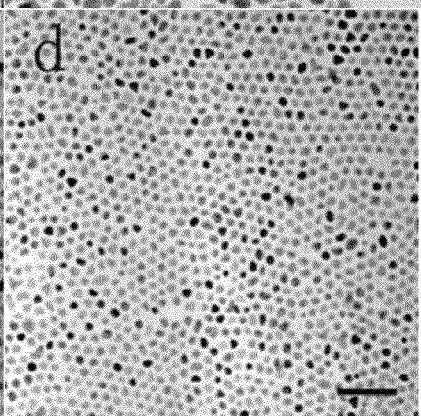

The "slowdown" of Pt-nucleation by $W(CO)_6$ favors the evolution of $Pt_3M$ NCs because Pt clusters can be steadily and continuously provided for the Ostwald growth in this case. An additional piece of evidence supporting this notion is the observation of $W^{6+}$ peak in the XPS spectra of the reaction residue. Instead of the "expected" metallic W peak, two observed peaks are assigned to $W_{4f5/2}$ and $W_{4f7/2}$ ionic W peaks {32} as shown in FIG. 19, no peak from $W^0$ was determined. In another set of blank experiments, preparation of pure W Nanocrystals was performed by decomposition of tungsten carbonyl alone under the similar reaction conditions for the $Pt_3M$ preparation. However, only a transparent solution was obtained without any trace of crystalline material. It is important to report that the employment of $W(CO)_6$ is important to the success of $Pt_3M$ NCb preparation. In the absence of $W(CO)_6$, no cubic NC formed under the same other experimental conditions as demonstrated in FIGS. 20A-20D. Nanoparticles were prepared under the same reaction conditions that described for synthesis of their nanocubes in the article, respectively, but in the absence of $W(CO)_6$ in all the cases. In addition, $W(CO)_6$ is not so volatile, compared to other carbonyls such as $Fe(CO)_5$ that have been ever used in Pt and Pt-based alloy NC syntheses, making it safer and easier to control the input amount.

Figure 21A:
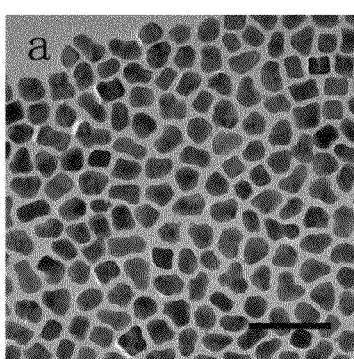
FIGS. 21A-21C show TEM images of Pt$_3$Co nanoparticles synthesized under the same reaction conditions as described for those of Pt$_3$Co nanocubes in the article but with different ratio between oleylamine and oleic acid.
Figure 21B:
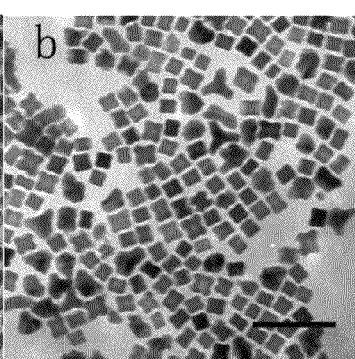
Figure 21C:
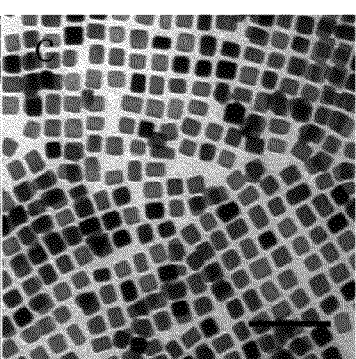

It is also commonly believed that freshly formed tiny nanocrystallites after the nucleation process should be polyhedral containing various crystallographic planes on their surfaces.{23, 33} A high surface energy facet on a particle is an unstable plane and always associates with a high growth rate in a direction perpendicular to this facet, resulting in a rapid area-reduce or even elimination of this facet.{11, 34, 35} Although surface energy is an intrinsic property on a crystal facet, in a solution-based evolution environment it could be tuned with a number of parameters including the surfactant-binding capability.{23} To facilitate the growth of $Pt_3M$ NCs into cubes in an organic solution system, our strategy is to ensure that {100} are the crystal facets with the lowest total surface energy. This promotes a rapid elimination of other $Pt_3M$ planes, leading to the formation of $Pt_3M$ NCbs. It was reported that addition of oleic acid and oleylamine in sequence could generate FePt NCbs.{17} A mixture of oleylamine and oleic acid was employed as a pair of solvent/reducing and binding agents in our system. It was determined that neither a single oleylamine nor a sole oleic acid would lead to a formation of the $Pt_3M$ NCbs. It was further optimized that a ratio of 4:1 (vol %) between oleylamine and oleic acid can achieve well-defined $Pt_3M$ NCbs (taking the case of $Pt_3Co$ as an example, see FIGS. 21A-21C). In addition, such pair of oleylamine and oleic acid is useful. For instance, it may not be either partially or fully replaced by a non-coordination solvent such as dioctyl ether. To differentiate the capping agent from a stabilizing agent, that is, which one chemically caps on the surface of $Pt_3M$ and which one temporally stabilizes the $Pt_3M$ colloids, Fourier transform infrared (FT-IR) spectra of the as-prepared $Pt_3M$ NCbs was collected.

Figure 22:
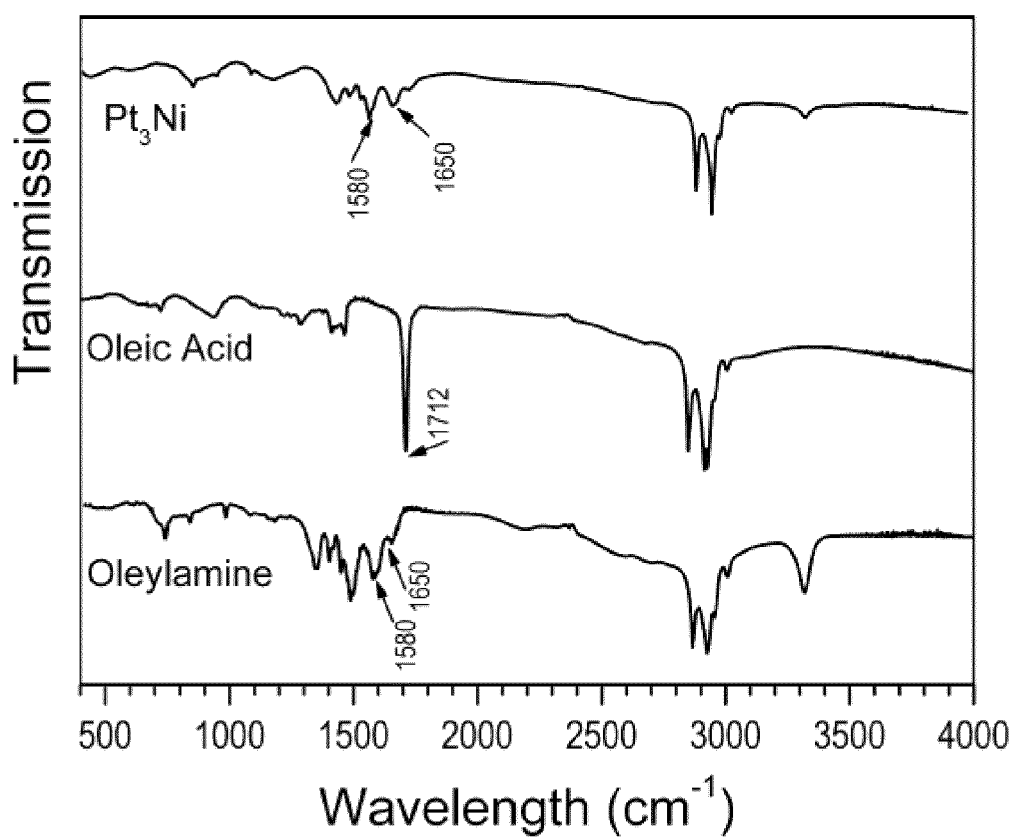
FIG. 22 shows a Fourier transform infrared spectra of as-synthesized Pt$_3$Ni nanocubes, oleic acid, and oleylamine.

As an example, FIG. 22 shows a FT-IR spectrum of the as-prepared $Pt_3Ni$ NCbs coated with the organic species, providing qualitative information of molecules capped on the surface of these NCbs. For comparison, both spectra of as-used oleylamine and oleic acid are also included, which are in good agreement with the literature data.{36, 37} The spectrum recorded on $Pt_3Ni$ NCbs is similar to that of the oleylamine, but not the oleic acid. For example, a band at ~1712 $cm^{-1}$ of oleic acid that can be attributed to the carbonyl C=O stretching mode{38} and a band at ~1560 from the asymmetric stretching of carbonyl in oleic acid{39} were not observed in the spectrum of $Pt_3Ni$ NCbs, whereas bands at ~1580 and 1650 cm$^{-1}$ that are assigned to the N—H deformation vibration of a primary amine{40} appear in both spectra of the oleylamine and the NCbs. These observations suggest that the organic residues finally capped on Pt$_3$Ni NCs are only oleylamine, although both oleylamine and oleic acid were used in the synthesis. One more observation supporting this conclusion is that addition of oleylamine can cease aggregation of newly prepared Pt$_3$Ni NCs, whereas oleic acid cannot. Based on the above discussion, it is believed that oleylamine may act as a capping agent coordinating on metal surface sites, slowing but not stopping NC's growth. During a crystal growth in solution, shape development of a NC is actually dependent on the competitive growth-rates perpendicular to various surface facets. The growth rate can be determined by the total surface energy in which the binding energy between a ligand and a given crystal facet is also a contribution. Obviously, a surface-selective capping agent may alter the morphology of a NC. We believe that oleylamine offers such a function in lowering down the binding energy (and therefore total surface energy) on {100} of Pt$_3$Ni. As for the co-reducing agent in the present system, our further investigation indicates that both oleylamine and W(CO)$_6$ that subsequently generates metallic W and CO contribute the reducing activities.

It is worth mentioning that the competitive segregation between Pt and M on the surface of a freshly resultant NC should also be an important consideration when preparing NCbs. In the case of Pt$_3$Ni, the addition of Ni precursors has to be postponed owing to the strong alloying capability between Pt and Ni. Due to the lack of stoichiometric nickel precursors in this approach, Pt seeds at the initial stage as well as Pt-surface-enriched Pt$_3$Ni NCs in the subsequent steps should always dominate the crystal growth, which is the driving force for developing cubic NCs. On the other hand, the extremely strong capability for Ni to alloy with Pt enables the limited amount of Ni, reduced from the slowly titrated nickel precursors, to promptly combine with Pt through inter-layer-diffusions with neither formation of pristine Ni-phase, nor the Pt-core-Ni-shell structure. Our investigation shows that pure Ni NCs could be detected only when the nickel precursors were introduced at a temperature higher than 210° C.

A facile, reliable and general synthetic protocol to fabricate high-quality {100}-bounded NCbs containing Pt and a 3d-transition metal, Co, Fe or Ni is provided. W(CO)$_6$ is useful in the control of nucleation process, whereas a fixed ratio of oleylamine and oleic acid pair enables lowest total-surface-energy on {100} facets in order to develop these NCbs in present system. These resultant monodisperse Nanocubes are expected to exhibit unusual electrocatalytical characteristics, providing an alternative opportunity of developing high-performance Pt-substituted electrocatalysts.

Before electrochemical measurements were made, the glassy carbon (GC) electrode supported catalysts were subjected to argon plasma treatment and potential cycling between 0.05 and 1.0 V to remove residual organic solvent and surfactant and to further clean the particle surface. These treatments have no apparent effect on the particle morphology as revealed by EM images. Furthermore, a cobalt dissolution current was absent on Pt$_3$Co cubes, in contrast to the Pt/Co alloys prepared by sputtering.{43}

Figure 23:
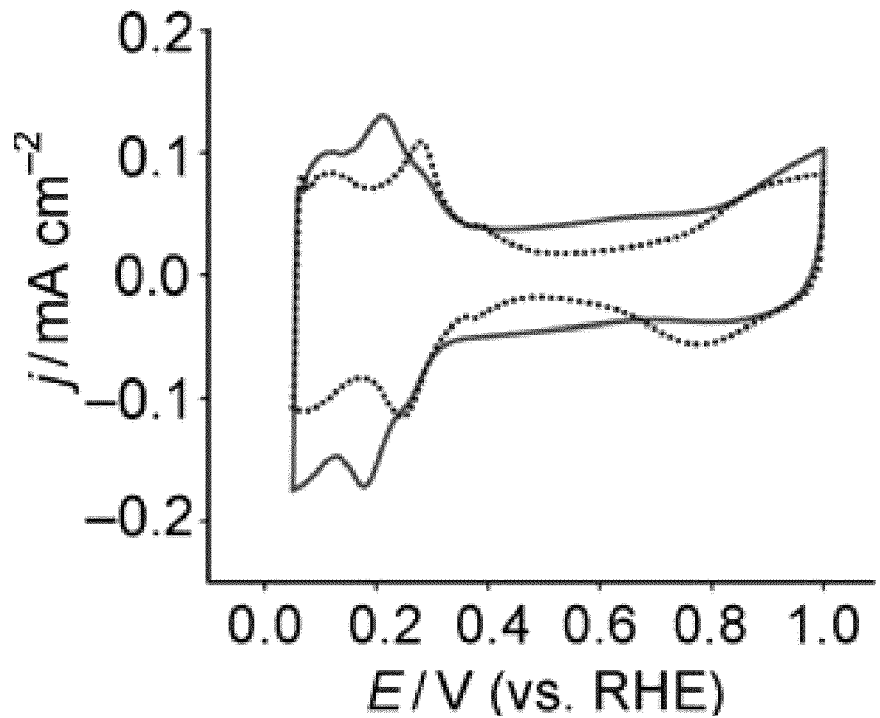
FIG. 23 shows cyclic voltammograms of Pt$_3$Co (solid) and Pt NCbs (interrupted) in 0.1 m HClO$_4$ at a scan rate of 0.1 V s$^{-1}$.
Figure 25:
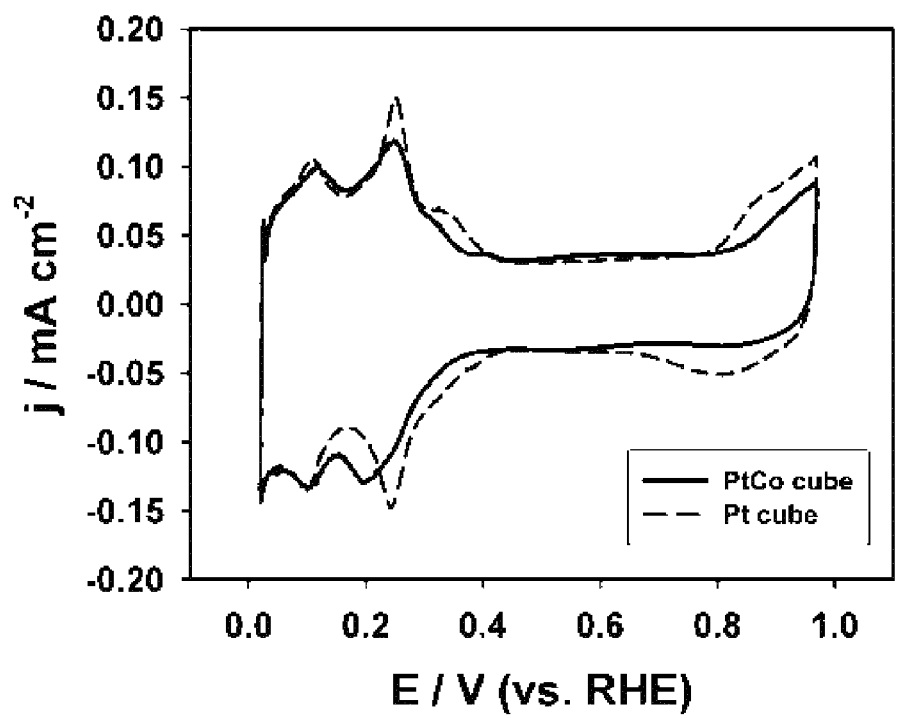
FIG. 25 shows cyclic voltammograms of cubic $Pt_3Co$ (solid) and Pt NCbs (interrupted) in 0.5 M $H_2SO_4$, with a scan rate of 0.1 V $s^{-1}$.

Typical cyclic voltammograms (CVs) of Pt$_3$Co and Pt NCbs recorded in deaerated 0.1 m HClO$_4$ are shown in FIG. 23. For Pt$_3$Co NCbs, the main feature of the voltammogram from 0.05 to 0.35 V is a pair of peaks at about 0.20 V together with a pair of weak peaks at 0.30 V. These current features can be attributed to hydrogen adsorption/desorption on Pt(100) surface sites, suggesting the particle surface is clean. Compared to the Pt NCbs, these peaks shift negatively by nearly 80 mV, suggesting weaker hydrogen adsorption on Pt3Co particle surfaces.{41} At the more positive potentials, an oxidative current from the formation of surface oxides appears at 0.80 V. Correspondingly, a very weak surface oxide reduction peak is discernable in the reverse potential scan. The surface oxidation onset potential of Pt$_3$Co NCbs is significantly more positive than that of Pt NCbs, indicating that Pt$_3$Co NCbs are more difficult to oxidize. This is also supported by the much smaller oxide reduction current observed on Pt$_3$Co NCbs compared to Pt NCbs. The less surface oxidation and the weaker hydrogen adsorption arise from the decrease of platinum d-band center by alloying with cobalt, as predicted by the d-band theory {42} and demonstrated experimentally by XPS.{43} The decrease of the platinum d-band center lowers the adsorption energy of adsorbates and will therefore affect its catalytic activity. For comparison with literature results, the VCV's were recorded in 0.5 m H$_2$SO$_4$ as well. The CV of Pt NCbs after the plasma and potential cycling treatments is similar to that reported by Feliu et al.{44} The voltammetric differences between Pt$_3$Co and Pt NCbs seen in 0.1 m HClO$_4$ are also observed in 0.5 m H$_2$SO$_4$, as shown in FIG. 25. This comparison further suggests that the above-mentioned cleaning treatments have little effect on the particle structure.

Figure 24:
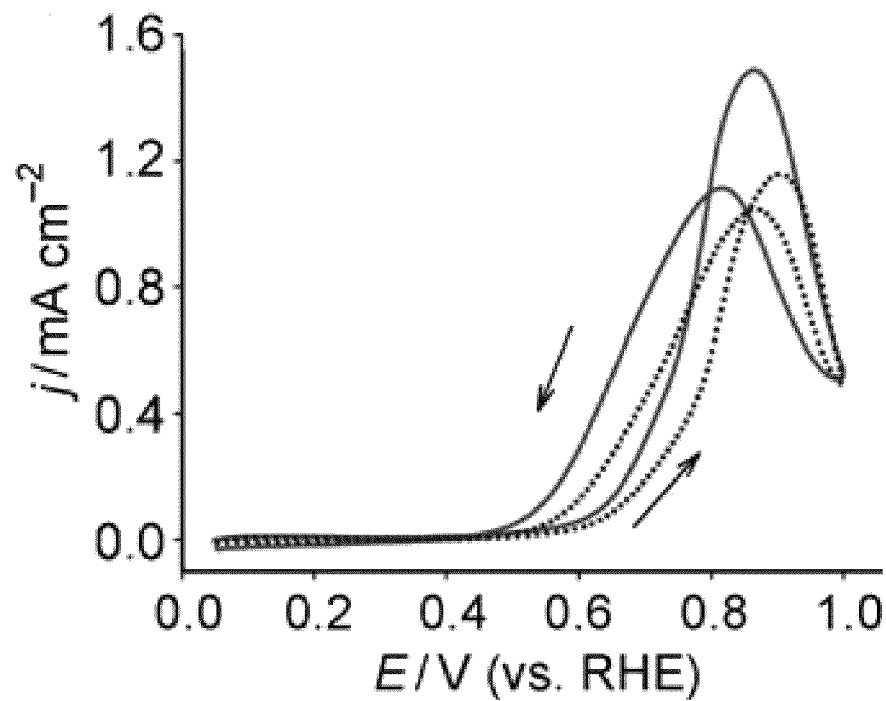
FIG. 24 shows cyclic voltammograms of methanol oxidation on Pt$_3$Co (solid) and Pt NCbs (interrupted) in 0.1 m HClO$_4$+1 m MeOH at a scan rate of 0.02 V s$^{-1}$, in which arrows indicate the potential scan direction.

FIG. 24 shows the voltammograms of methanol oxidation on Pt$_3$Co and Pt NCbs recorded in 0.1 m HClO$_4$+1 m MeOH. At potentials below 0.60 V, the oxidation current is negligible in both voltammograms because the active sites are poisoned by CO$_{ads}$, an intermediate from dehydrogenation of methanol. At more positive potentials, the oxidation current takes off rapidly, signifying that significant methanol oxidation occurs. The oxidation current peaks at 0.87 V on Pt$_3$Co NCbs, which is about 30 mV more negative than that on Pt NCbs. The overall current density on the positive potential sweep is higher on Pt$_3$Co NCbs. In the reversed potential scan, the current peak appears at 0.82 V on Pt$_3$Co and 0.87 V on Pt NCbs. The current density is higher on Pt$_3$Co NCbs at potentials lower than 0.85 V until about 0.45 V, where the oxidation current is again negligible because of the surface poisoning. The higher current density on Pt$_3$Co NCbs at lower potentials indicates enhanced methanol oxidation catalytic activity. This observation agrees with those reported on Pt/Co alloy particles.{45, 46, 47, 48} The advantage of present study is that the particle shape and hence the catalyst surface structure is controlled. Therefore, the enhancement in catalytic activity is likely solely from the alloying effect, as opposed to the possible additional structural effect in the previous studies.

Figure 27:
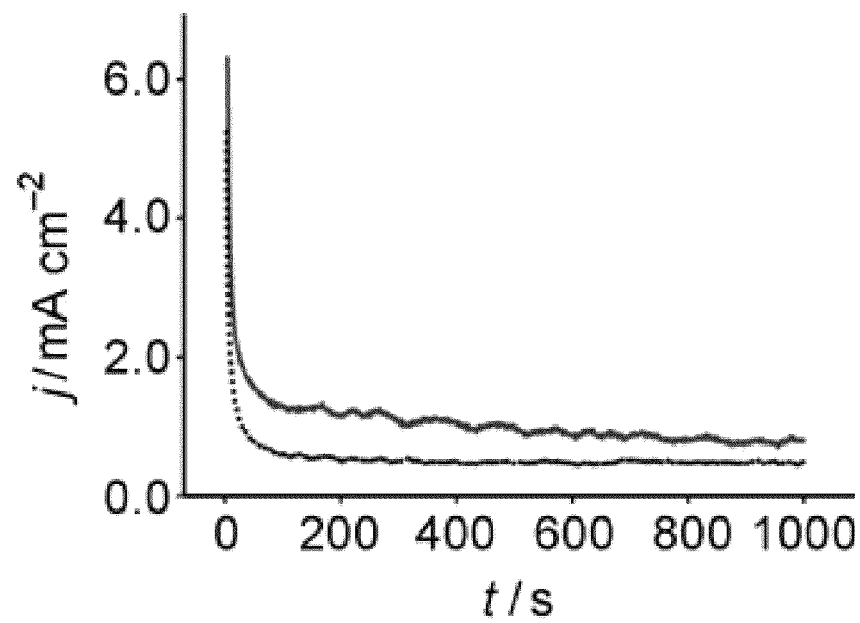
FIG. 27 shows chronoamperometric plots of MeOH oxidation at 0.50 V on cubic $Pt_3Co$ (solid) and Pt NCbs (interrupted) in 0.1 m $HClO_4$+1 m MeOH.
Figure 28:
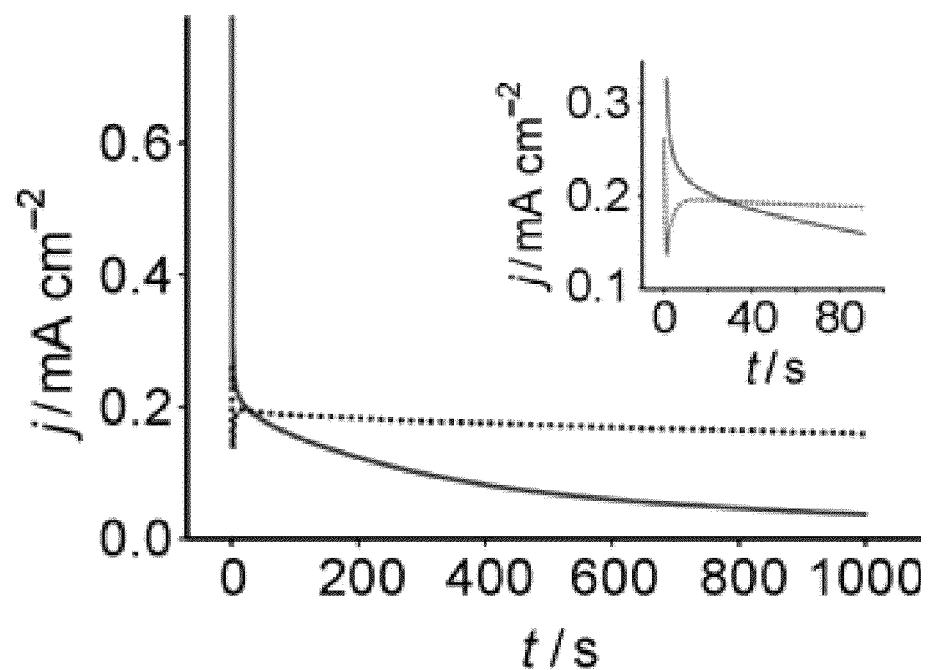
FIG. 28 shows Chronoamperometric plots of MeOH oxidation at 0.70 V on cubic $Pt_3Co$ (solid) and Pt NCbs (interrupted) in 0.1 m $HClO_4$+1 m MeOH, in which the inset is an enlargement of a shorter time section.

To evaluate the steady-state catalytic activity, chrono-amperometric (CA) measurements were performed at 0.50, 0.60, and 0.70 V. The current transient was recorded after the electrode potential was stepped from 0.05 V to the desired potentials. The current-time response at 0.60 V is similar to that at 0.70 V, except for a smaller current at the lower potential; therefore, only results recorded at 0.50 and 0.70 V are presented in FIGS. 27 and 28. Consistent with the CV results, the methanol oxidation current density (normalized to platinum surface area) of Pt$_3$Co NCbs is higher than that of Pt NCbs at 0.50 Vover the entire time period examined. Interestingly, at 0.70 V, the current density on Pt$_3$Co NCbs is initially higher, but decays rapidly. After about 30 s, it becomes lower than that on Pt NCbs (FIG. 28, inset). From this point on, the current density on Pt NCbs decays slowly, but continues to rapidly decrease on Pt$_3$Co NCbs. By the end of the measurement, the methanol oxidation current density on Pt NCbs is more than four times of that on Pt$_3$Co NCbs.

Figure 26:
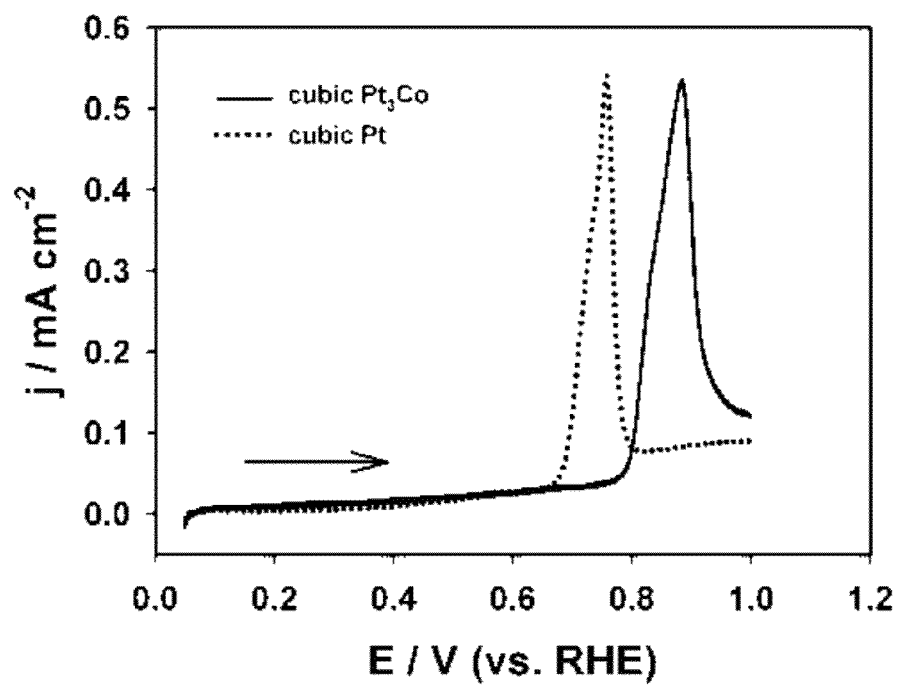
FIG. 26 shows cyclic voltammograms of CO stripping on cubic $Pt_3Co$ (solid) and Pt NCbs (interrupted) in 0.1 M $HClO_4$, with a scan rate of 0.1 V $s^{-1}$, in which the arrow indicates the potential scan direction.

It is generally accepted that electrochemical oxidation of methanol on platinum catalysts follows a "dual-pathway"

mechanism.{49-54} In the direct pathway, methanol oxidation produces intermediates that are dissolved in the solution and are oxidized to form $CO_2$. In the indirect pathway, the oxidation goes through the formation of $CO_{ads}$, which poisons the catalyst surface. A frequently invoked explanation of enhanced methanol oxidation on Pt/Co alloys is the facilitation of CO oxidation by forming $OH_{ads}$ at lower potentials in the presence of cobalt,{47} similar to that used in Pt/Ru system. This is apparently not the case herein, as the CO stripping experiments clearly show that $Pt_3Co$ NCbs are less effective for CO removal (FIG. 26), which is very likely due to the lack of $OH_{ads}$ necessary for CO oxidation. The formation of $OH_{ads}$ on $Pt_3Co$ NCbs requires a much higher potential compared to that on Pt NCbs, as evident in the formation of surface oxides at a much higher potential on the former particles. The less-facile CO removal on $Pt_3Co$ NCbs is responsible for the rapid decay of methanol oxidation observed at 0.70 V. In contrast, on Pt NCbs CO oxidation already takes place at 0.70 V, therefore there is not much CO accumulation on the surface and methanol oxidation proceeds at nearly the same rate. This is in accordance with the CV results of methanol oxidation. On the timescale of CV measurements, Co poisoning of the $Pt_3Co$ NCb surface is not severe and therefore a higher methanol oxidation current was observed on $Pt_3Co$ NCbs. The higher activity of $Pt_3Co$ NCbs for methanol oxidation at 0.50 V, where CO oxidation does not occur on either particles, further supports the proposal that facile CO oxidation is not responsible for the observed enhanced methanol oxidation. This presents two possibilities: CO coverage on $Pt_3Co$ NCbs is lower than that on Pt NCbs, and/or the indirect pathway is promoted by $Pt_3Co$ NCbs. By using dilute CO solutions to form $CO_{ads}$, it is possible to monitor the rate of CO adsorption by measuring the amount of $CO_{ads}$ formed at a given time.{55} The results reveal that CO coverage on $Pt_3Co$ NCbs is about 50% of that on Pt NCbs when a 100-fold diluted CO saturated solution was used for forming $CO_{ads}$ layer in 2 min. This observation agrees with that reported by Uchida et al., namely that CO adsorption is much slower on PtCo alloy surfaces.{55} The slower CO adsorption delays surface blocking and leads to a higher methanol oxidation activity at a short time, which is in agreement with the experimental observations (FIGS. 28 and 29). It has been demonstrated by Cao et al. that direct pathway on Pt{100} surface is not as important as on the other two low index planes.{56}

High-quality and {100}-facet-terminated $Pt_3Co$ and Pt NCbs were prepared. A comparative study on their electrocatalytic activities towards methanol oxidation shows that $Pt_3Co$ NCbs are much more active. The enhanced catalytic activity is attributed to weaker and slower CO adsorption. This suggests that the $Pt_3Co$ NCbs and other platinum alloy NCbs could be promising anode electrocatalysts for direct methanol fuel cells with high activity, low cost, and CO poisoning resistance.

See, Hongzhou Yang, Jun Zhang, Kai Sun, Shouzhong Zou, and Jiye Fang, "Enhancing by Weakening: Electrooxidation of Methanol on $Pt_3Co$ and Pt Nanocubes", Angew. Chem. Int. Ed. 2010, 49, 6848-6851, expressly incorporated herein by reference in its entirety (including supporting materials).

REFERENCES

Incorporated Herein by Reference

{1} Wang, C.; Daimon, H.; Lee, Y.; Kim, J.; Sun, S. *J. Am. Chem. Soc.* 2007, 129, 6974-6975.

{2} Paulus, U. A.; Wokaun, A.; Scherer, G. G.; Schmidt, T. J.; Stamenkovic, V.; Markovic, N. M.; Ross, P. N. *Electrochim. Acta* 2002, 47, 3787-3798.

{3} Stamenkovic, V.; Mun, B. S.; Mayrhofer, K. J. J.; Ross, P. N.; Markovic, N.; Rossmeisl, J.; Greeley, J.; Nørskov, J. K. *Angew. Chem. Int. Ed.* 2006, 45, 2897-2901.

{4} Stamenkovic, V. R.; Mun, B. S.; Arenz, M.; Mayrhofer, K. J. J.; Lucas, C. A.; Wang, G.; Ross, P. N.; Markovic, N. M. *Nat. Mater.* 2007, 6, 241-247.

{5} Mukerjee, S.; Srinivasan, S.; Soriaga, M. P. *J. Electrochem. Soc.* 1995, 142, 1409-1422.

{6} Watanabe, M.; Tsurumi, K.; Mizukami, T.; Nakamura, T.; Stonehart, P. *J. Electrochem. Soc.* 1994, 141, 2659-2668.

{7} Koh, S.; Leisch, J.; Toney, M. F.; Strasser, P. *J. Phys. Chem. C* 2007, 111, 3744-3752.

{8} Shevchenko, E. V.; Talapin, D. V.; Schnablegger, H.; Kornowski, A.; Festin, Ö.; Svedlindh, P.; Haase, M.; Weller, H. *J. Am. Chem. Soc.* 2003, 125, 9090-9101.

{9} Narayanan, R.; El-Sayed, M. A. *J. Am. Chem. Soc.* 2004, 126, 7194-7195.

{10} Narayanan, R.; El-Sayed, M. A. *Nano. Lett.* 2004, 4, 1343-1348.

{11} Tian, N.; Zhou, Z.-Y.; Sun, S.-G.; Ding, Y.; Wang, Z. L. *Science* 2007, 316, 732-735.

{12} Peng, Z.; Yang, H. *Nanotoday* 2009, 4, 143-164.

{13} Wang, C.; Daimon, H.; Onodera, T.; Koda, T.; Sun, S. *Angew. Chem. Int. Ed.* 2008, 47, 3588-3591.

{14} Kim, C.; Lee, H. *Catal. Commun.* 2009, 10, 1305-1309.

{15} Habas, S. E.; Lee, H.; Radmilovic, V.; Somorjai, G. A.; Yang, P. *Nat. Mater.* 2007, 6, 692-697.

{16} Lee, H.; Habas, S. E.; Kweskin, S.; Butcher, D.; Somorjai, G. A.; Yang, P. *Angew. Chem. Int. Ed.* 2006, 45, 7824-7828.

{17} Chen, M.; Kim, J.; Liu, J. P.; Fan, H.; Sun, S. *J. Am. Chem. Soc.* 2006, 128, 7132-7133.

{18} Refer to JCPDS-ICDD cards: Pt, 04-0802; Pt3Co, 29-0499; Pt3Fe, 89-2050, 29-0716 and 29-1423.

{19} Ahrenstorf, K.; Heller, H.; Kornowski, A.; Broekaert, J. A. C.; Weller, H. *Adv. Funct. Mater.* 2008, 18, 3850-3856.

{20} Ahrenstorf, K.; Albrecht, O.; Heller, H.; Kornowski, A.; Gçrlitz, D.; Weller, H. *Small* 2007, 3, 271-274.

{21} Lu, W.; Fang, J.; Stokes, K. L.; Lin, J. *J. Am. Chem. Soc.* 2004, 126, 11798-11799.

{22} Zhang, J.; Kumbhar, A.; He, J.; Das, N.C.; Yang, K.; Wang, J.-Q.; Wang, H.; Stokes, K. L.; Fang, J. *J. Am. Chem. Soc.* 2008, 130, 15203-15209.

{23} Xiong, Y.; Xia, Y. *Adv. Mater.* 2007, 19, 3385-3391.

{24} Murray, C. B.; Kagan, C. R.; Bawendi, M. G. *Annu. Rev. Mater. Sci.* 2000, 30, 545-610.

{25} Zhang, J.; Sun, K.; Kumbhar, A.; Fang, J. *J. Phys. Chem. C* 2008, 112, 5454-5458.

{26} Sun, S.; Murray, C. B. *J. Appl. Phys.* 1999, 85, 4325-4330.

{27} Song, Q.; Zhang, Z. J. *J. Am. Chem. Soc.* 2004, 126, 6164-6168.

{28} Xiong, L.; He, T. *Electrochem. Commun.* 2006, 8, 1671-1676.

{29} Alexeev, O.; Shelef, M.; Gates, B. C. *J. Catal.* 1996, 164, 1-15.

{30} Mietrach, D. U.S. Pat. No. 4,674,675, sheet 676/677, Jun. 23, 1987.

{31} Vanysek, P. In *CRC Handbook of Chemistry and Physics*; Lide, D. R., Ed.; CRC Press: Boca Raton, Fla., 2006; Vol. 87th, pp 8/20-28/29.

{32} Bigey, C.; Logie, V.; Bensaddik, A.; Schmitt, J. L.; Maire, G. *J. Phys. IV France* 1998, 8, Pr5-553-560.

{33} Wang, Z. L. *J. Phys. Chem. B* 2000, 104, 1153-1175.

{34} Lee, S.-M.; Jun, Y.-w.; Cho, S.-N.; Cheon, J. *J. Am. Chem. Soc.* 2002, 124, 11244-11245.

{35} Ren, J.; Tilley, R. D. *J. Am. Chem. Soc.* 2007, 129, 3287-3291.

{36} Yang, H. T.; Shen, C. M.; Wang, Y. G.; Su, Y. K.; Yang, T. Z.; Gao, H. J. *Nanotechnology* 2004, 15, 70-74.

{37} Xu, Z.; Shen, C.; Hou, Y.; Gao, H.; Sun, S. *Chem. Mater.* 2009, 21, 1778-1780.

{38} Roonasi, P.; Holmgren, A. *Appl. Surf. Sci.* 2009, 255, 5891-5895.

{39} Luo, J.; Han, L.; Kariuki, N. N.; Wang, L.; Mott, D.; Zhong, C.-J.; He, T. *Chem. Mater.* 2005, 17, 5282-5290.

{40} Socrates, G. *Infrared Characteristic Group Frequencies;* 2nd Ed. ed.; John Wiley & Sons: Chichester, 1994.

{41} J. Solla-Gullòn, F. J. Vidal-Iglesias, A. Lòpez-Cudero, E. Garnier, J. M. Feliu, A. Aldaz, Phys. Chem. Chem. Phys. 2008, 10, 3689-3698.

{42} J. R. Kitchin, J. K. Nørskov, M. A. Barteau, J. G. Chen, Phys. Rev. Lett. 2004, 93, 156801.

{43} M. Wakisaka, S. Mitsui, Y. Hirose, K. Kawashima, H. Uchida, M. Watanabe, J. Phys. Chem. B 2006, 110, 23489-23496.

{44} J. Solla-Gullòn, P. Rodríguez, E. Herrero, A. Aldaz, J. M. Feliu, Phys. Chem. Chem. Phys. 2008, 10, 1359-1373.

{45} Q.-S. Chen, S.-G. Sun, Z.-Y. Zhou, Y.-X. Chen, S.-B. Deng, Phys. Chem. Chem. Phys. 2008, 10, 3645-3654.

{46} G. Chen, D. Xia, Z. Nie, Z. Wang, L. Wang, L. Zhang, J. Zhang, Chem. Mater. 2007, 19, 1840-1844.

{47} J. Zeng, J. Y. Lee, J. Power Sources 2005, 140, 268-273.

{48} X. Zhang, K.-Y. Chan, J. Mater. Chem. 2002, 12, 1203-1206.

{49} M. Z. Markarian, M. E. Harakeh, L. I. Halaoui, J. Phys. Chem. B 2005, 109, 11616-11621.

{50} T. H. M. Housmans, A. H. Wonders, M. T. M. Koper, J. Phys. Chem. B 2006, 110, 10021-10031.

{51} C. Korzeniewski, C. L. Childers, J. Phys. Chem. B 1998, 102, 489-492.

{52} Y. X. Chen, A. Miki, S. Ye, H. Sakai, M. Osawa, J. Am. Chem. Soc. 2003, 125, 3680-3681.

{53} E. A. Batista, G. R. P. Malpass, A. J. Motheo, T. Iwasita, Electrochem. Commun. 2003, 5, 843-846.

{54} H. Wang, T. Löffler, H. Baltruschat, J. Appl. Electrochem. 2001, 31, 759-765.

{55} H. Uchida, K. Izumi, K. Aoki, M. Watanabe, Phys. Chem. Chem. Phys. 2009, 11, 1771-1779.

{56} D. Cao, G.-Q. Lu, A. Wieckowski, S. A. Wasileski, M. Neurock, J. Phys. Chem. B 2005, 109, 11622-11633.

What is claimed is:

1. Catalytic particles, comprising:
nano-particles presenting a plurality of facets having catalytic activity with respect to at least an oxidation-reduction reaction, formed by a process comprising:
heating and mixing an organic solution comprising a soluble platinum salt, a set of capping agents having a reducing potential sufficient to reduce the soluble platinum salt, and having surface active properties to lower a surface energy on facets of particles formed from the reduced platinum salt, and a shape control agent comprising a compound of a metal other than platinum, to selectively control a shape of the formed particles to provide at least one {111} terminated facet on each nano-particle; and
separating formed particles from the solution.

2. The catalytic particles according to claim 1, wherein the soluble platinum salt is platinum (II) acetylacetonate.

3. The catalytic particles according to claim 1, wherein the process further comprises adding a soluble transition metal salt to the organic solvent, wherein the formed particles comprise an alloy of platinum and the transition metal.

4. The catalytic particles according to claim 3, wherein the transition metal salt comprises nickel.

5. The catalytic particles according to claim 3, wherein the transition metal salt is nickel (II) acetylacetonate.

6. The catalytic particles according to claim 3, wherein the transition metal salt comprises at least one of copper (II) chloride, bromide, and iodide, and wherein the formed particles comprise PtCu.

7. The catalytic particles according to claim 1, wherein the process is conducted under anoxic conditions.

8. The catalytic particles according to claim 1, wherein the shape control agent comprises Tungsten hexacarbonyl.

9. The catalytic particles according to claim 1, wherein the shape control agent comprises molybdenum hexacarbonyl.

10. The catalytic particles according to claim 1, wherein the shape control agent comprises chromium hexacarbonyl.

11. The catalytic particles according to claim 1, wherein the process comprises heating the solvent to a temperature of about 170 C to 240 C.

12. The catalytic particles according to claim 1, wherein the process further comprises resuspending the formed particles in a non-polar organic solvent.

13. The catalytic particles according to claim 1, wherein the formed particles are substantially monodisperse nanopolyhedra.

14. The catalytic particles according to claim 1, wherein the organic solution comprises oleylamine and oleic acid.

15. The catalytic particles according to claim 1, wherein the process further comprises adding a soluble transition metal salt to the organic solution, wherein:
the formed particles comprise an alloy of platinum and the transition metal;
the soluble platinum salt comprises platinum (II) acetylacetonate;
the organic solution comprises oleylamine and oleic acid;
the shape control agent comprises tungsten hexacarbonyl; and
the formed particles are substantially monodisperse nanoctahedral catalytic particles.

16. The catalytic particles according to claim 15, wherein the transition metal salt comprises nickel (II) acetylacetonate, and wherein the formed particles comprise $Pt_3Ni_1$.

17. Monodisperse nanopolyhedric catalytic particles, formed by a process comprising:
heating and mixing a soluble platinum salt in an organic solution comprising a set of capping agents having a reducing potential sufficient to reduce the platinum salt, and having surface active properties to lower a surface energy on facets of formed particles, wherein the formed particles each have at least one {111} terminated facet;
adding a shape control agent comprising a metal other than platinum, to selectively control a particle shape; and
separating the formed particles from the solution.

18. The particles according to claim 17, wherein the particles are formed by a process further comprising adding a soluble transition metal salt to the organic solvent, wherein the formed particles comprise an alloy of platinum and the transition metal, wherein the transition metal salt comprises at least one of nickel, cobalt and copper, and wherein the shape control agent comprises at least one of Tungsten hexacarbonyl, molybdenum hexacarbonyl, and chromium hexacarbonyl.

19. The particles according to claim 17, wherein the organic solution comprises oleylamine and oleic acid.

20. The particles according to claim 17, wherein the particle is formed by a process further comprising adding a soluble transition metal salt to the organic solution, wherein:
- the formed particles comprise an alloy of platinum and the transition metal;
- the soluble platinum salt comprises platinum (II) acetylacetonate;
- the organic solution comprises oleylamine and oleic acid;
- the shape control agent comprises tungsten hexacarbonyl; and
- the formed particles are substantially monodisperse nanoctahedral catalytic particles.

21. The particles according to claim 17, wherein the transition metal salt comprises nickel, the transition metal salt is nickel (II) acetylacetonate, and the formed particles comprise $Pt_3Ni_1$.

22. The particles according to claim 17, wherein the transition metal salt comprises copper, the transition metal salt is at least one of copper (II) chloride, bromide, and iodide, and the formed particles comprise PtCu.

23. Monodisperse nanopolyhedric crystalline catalytic particles comprising a platinum-transition metal alloy, having a nanocubic or a nanooctahedric configuration having at least one {111} terminated facet, configured to catalyze at least an oxidation reduction reaction of a direct methanol fuel cell with greater resistance to carbon monoxide poisoning than a pure platinum metal particle catalyst particle having the same surface area.

* * * * *